United States Patent
Oleksandr et al.

(10) Patent No.: US 12,482,204 B2
(45) Date of Patent: Nov. 25, 2025

(54) METHOD AND DEVICE FOR GENERATING IMAGE FOR ARRANGING OBJECTS

(71) Applicant: Samsung Electronics Co., Ltd., Suwon-si (KR)

(72) Inventors: Shchur Oleksandr, Kyiv (UA); Yakishyn Yevhenii, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 17/961,935

(22) Filed: Oct. 7, 2022

(65) Prior Publication Data
US 2023/0037221 A1 Feb. 2, 2023

Related U.S. Application Data

(63) Continuation of application No. PCT/KR2021/004349, filed on Apr. 7, 2021.

(30) Foreign Application Priority Data

Apr. 8, 2020 (KR) .................. 10-2020-0042960

(51) Int. Cl.
*G06T 19/20* (2011.01)
*G06T 7/20* (2017.01)
(Continued)

(52) U.S. Cl.
CPC .............. *G06T 19/20* (2013.01); *G06T 7/20* (2013.01); *G06T 7/70* (2017.01); *G06T 17/00* (2013.01);
(Continued)

(58) Field of Classification Search
CPC ......... G06F 3/011; G06T 17/00; G06T 19/20; G06T 2219/2004; G06T 7/20; G06T 7/70; G06V 10/761; G06V 10/764
See application file for complete search history.

(56) References Cited

U.S. PATENT DOCUMENTS 10,339,497 B2 7/2019 Gabbai
10,627,625 B2 4/2020 Hoover et al.
(Continued)

FOREIGN PATENT DOCUMENTS

JP H11-316858 A 11/1999
JP 2004-355578 A 12/2004
(Continued)

OTHER PUBLICATIONS

Image Inpainting for Irregular Holes Using Partial Convolutions by Guilin Liu, Fitsum A. Reda, Kevin J. Shih, Ting-Chun Wang, Andrew Tao, Bryan Catanzaro. NVIDIA Corporation, 2018.
(Continued)

*Primary Examiner* — Ming Wu
(74) *Attorney, Agent, or Firm* — Jefferson IP Law, LLP

(57) ABSTRACT

A method and a device for generating a virtual arrangement image in which a plurality of objects are rearranged are provided. The device obtains an image with respect to a plurality of objects, determine at least one of a visual characteristic, a physical characteristic, or a usability characteristic of each of the plurality of objects based on the obtained image, generate data about a result of arranging the plurality of objects based on at least one of the visual characteristic, the physical characteristic, or the usability characteristic, generate a virtual arrangement image in which the plurality of objects are arranged based on the data about the result of arranging the plurality of objects, and display the virtual arrangement image.

14 Claims, 30 Drawing Sheets

(51) Int. Cl.
*G06T 7/70* (2017.01)
*G06T 17/00* (2006.01)
*G06V 10/74* (2022.01)

(52) U.S. Cl.
CPC .... *G06V 10/761* (2022.01); *G06T 2219/2004* (2013.01)

(56) References Cited

U.S. PATENT DOCUMENTS

| | | | |
|---|---|---|---|
| 10,726,309 B2* | 7/2020 | Lee | G06T 7/248 |
| 11,205,308 B1* | 12/2021 | Chen | G06T 7/593 |
| 2014/0267408 A1 | 9/2014 | Mullins | |
| 2016/0179336 A1 | 6/2016 | Ambrus et al. | |
| 2017/0343906 A1* | 11/2017 | Huang | G06K 7/10366 |
| 2018/0068255 A1 | 3/2018 | Hance et al. | |
| 2019/0050691 A1* | 2/2019 | Lee | G06F 18/24323 |
| 2019/0318543 A1* | 10/2019 | Skidmore | G06T 15/20 |
| 2019/0324568 A1 | 10/2019 | Nam | |
| 2020/0016767 A1 | 1/2020 | Song | |
| 2020/0311488 A1 | 10/2020 | Lee et al. | |
| 2020/0348749 A1* | 11/2020 | Fukazawa | G06F 3/017 |

FOREIGN PATENT DOCUMENTS

| | | |
|---|---|---|
| JP | 4332617 B2 | 9/2009 |
| KR | 10-0711559 B1 | 4/2007 |
| KR | 10-0952574 B1 | 4/2010 |
| KR | 10-2011-0039072 A | 4/2011 |
| KR | 10-2012-0061197 A | 6/2012 |
| KR | 10-2013-0129864 A | 11/2013 |
| KR | 10-2017-0054068 A | 5/2017 |
| KR | 10-1759415 B1 | 7/2017 |
| KR | 10-2017-0096129 A | 8/2017 |
| KR | 10-2019-0018274 A | 2/2019 |
| KR | 10-2019-0031526 A | 3/2019 |
| KR | 10-2019-0038886 A | 4/2019 |
| KR | 10-2019-0104483 A | 9/2019 |
| WO | 2019/142621 A1 | 7/2019 |

OTHER PUBLICATIONS

Chaohao Xie et al., Image Inpainting with Learnable Bidirectional Attention Maps, Sep. 5, 2015.
Rui Yao et al., Video Object Segmentation and Tracking: A Survey, Jan. 2019.
Michael Zollhöfer et al., State of the Art on 3D Reconstruction with RGB-D Cameras, 2018.
http://epsilon-it.utu.fi/wv_demo/.
https://www.blender.org/download/releases/2-82/ a software for rendering and physical simulation_Mar. 12, 2020.
International Search Report dated Jul. 9, 2021, issued in International Application No. PCT/KR2021/004349.
Korean Office Action dated Dec. 3, 2024, issued in Korean Application No. 10-2020-0042960.
Korean Office Action dated Aug. 27, 2025, issued in Korean Application No. 10-2020-0042960.

* cited by examiner

FIG. 1
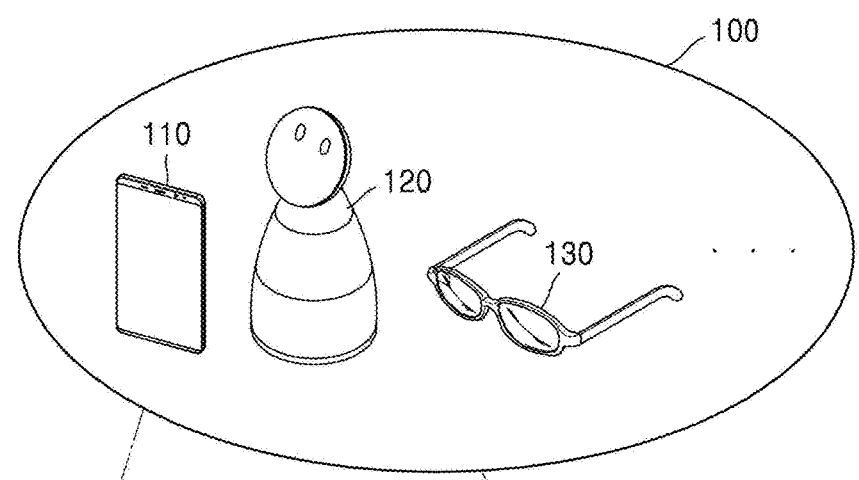
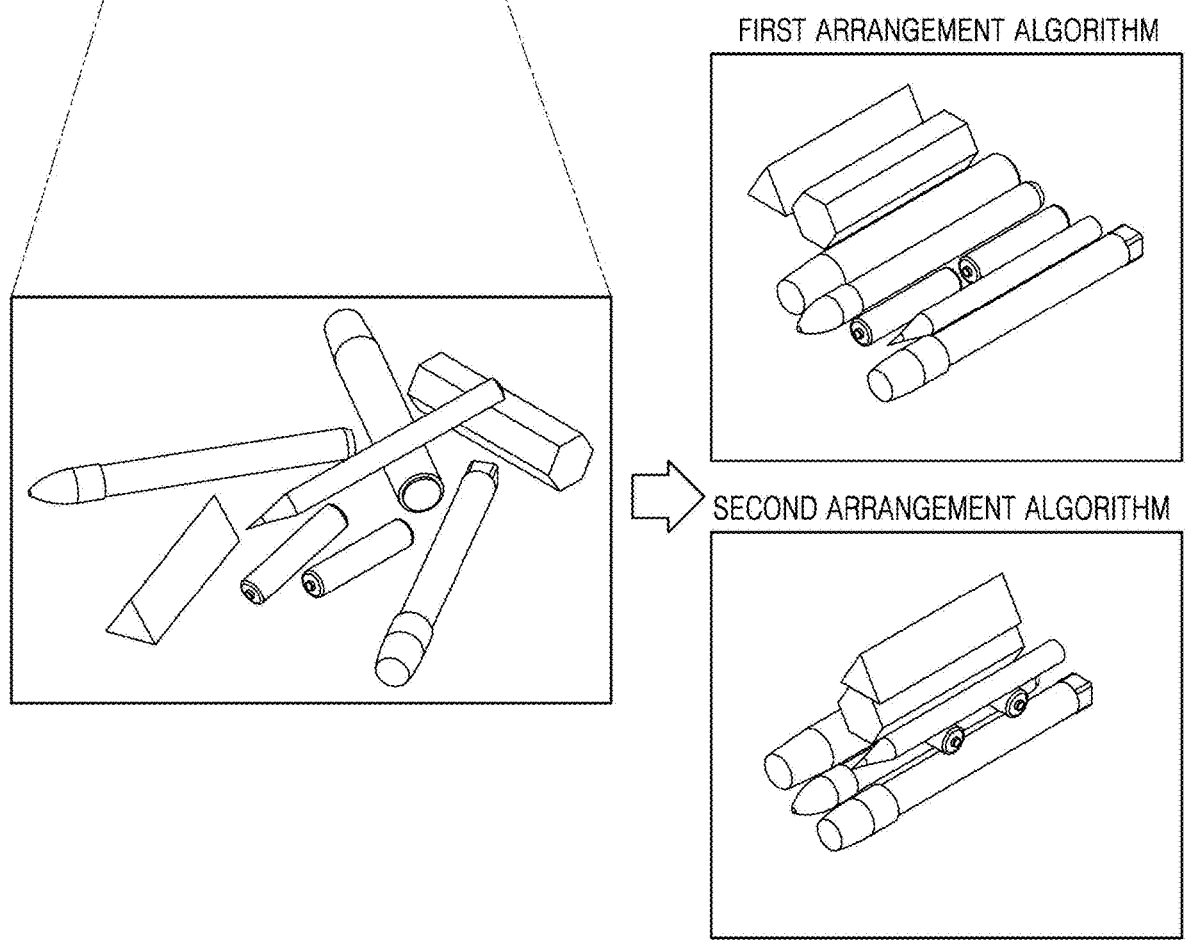

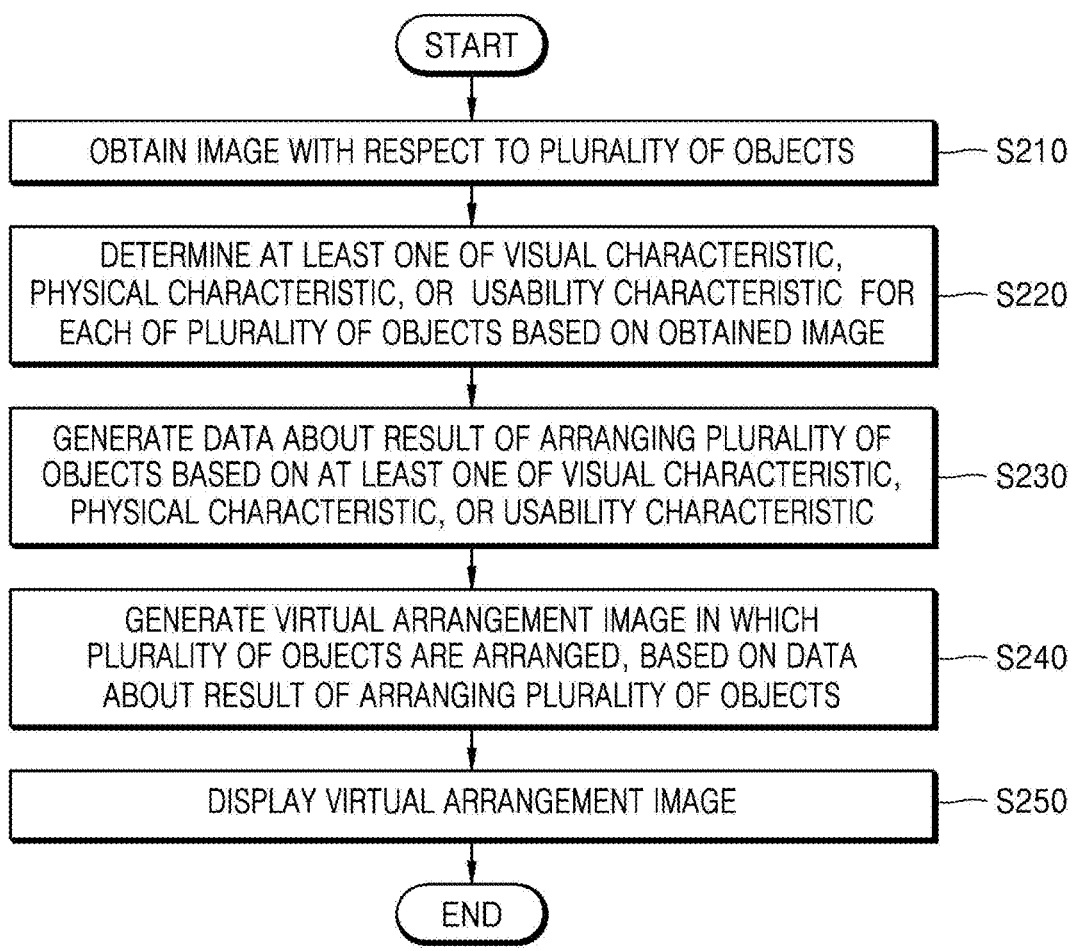

TEXT LABEL: FLIPCHART MARKER

| OBJECT | AVERAGE WEIGHT (g) | FRICTIONAL COEFFICIENT | CENTER OF MASS | BENDING | STRETCH-ABILITY | RISK |
|---|---|---|---|---|---|---|
| ⋮ | ⋮ | ⋮ | ⋮ | ⋮ | ⋮ | ⋮ |
| FLIPCHART MARKER | 15 | 0.2 | CENTER | NO | NO | NO |
| ⋮ | ⋮ | ⋮ | ⋮ | ⋮ | ⋮ | ⋮ |

INITIAL IMAGE → FIRST VIRTUAL ARRANGEMENT IMAGE

INITIAL IMAGE → SECOND VIRTUAL ARRANGEMENT IMAGE

FIG. 8

| FIRST OBJECT | SECOND OBJECT | GloVe | D12*1000 | m1, g | m2, g | F1/a(t) | F2/a(t) |
|---|---|---|---|---|---|---|---|
| marker | pen | 0.352 | 43.6 | 15 | 7 | 43.6*7^(2/3)=160 | 43.6 |
| marker | battery | 0.0493 | 0.120 | 15 | 20 | 0.120*15^(2/3)=0.73 | 0.120 |
| marker | charger | 0.149 | 3.30 | 15 | 235 | 3.3*15^(2/3)=20 | 3.30 |
| pen | battery | 0.159 | 4.00 | 7 | 20 | 4.0*7^(2/3)=14.6 | 4.00 |
| pen | charger | 0.229 | 12.0 | 7 | 235 | 12*7^(2/3)=43.9 | 12.0 |
| battery | charger | 0.559 | 175 | 20 | 235 | **175*20^(2/3)=1289 | 175** |

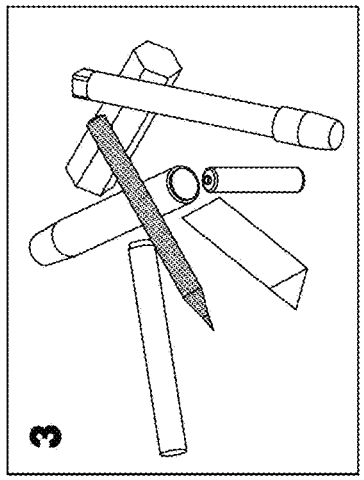 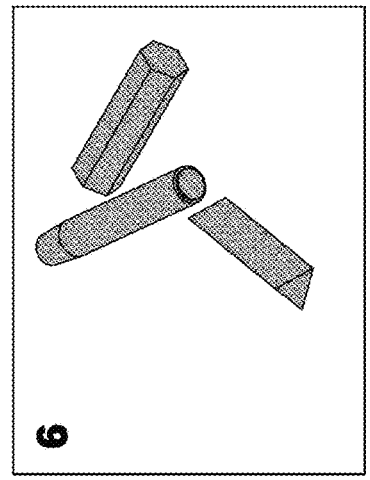
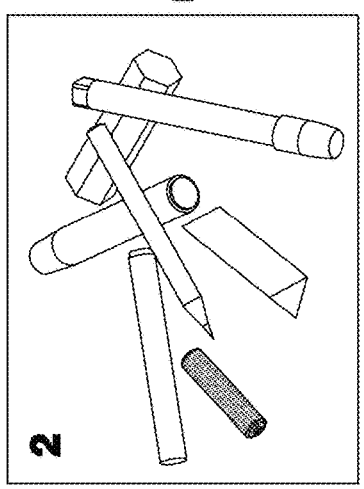 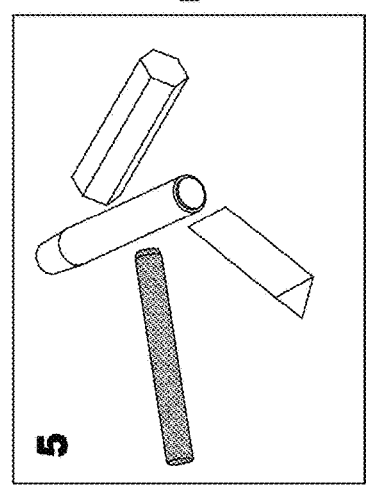
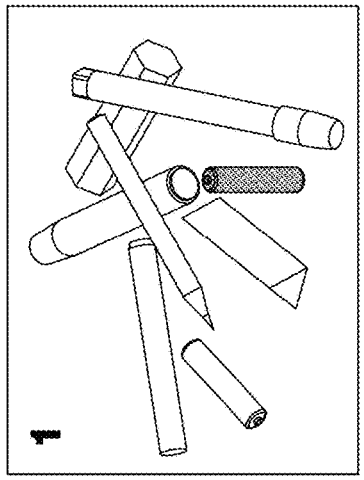 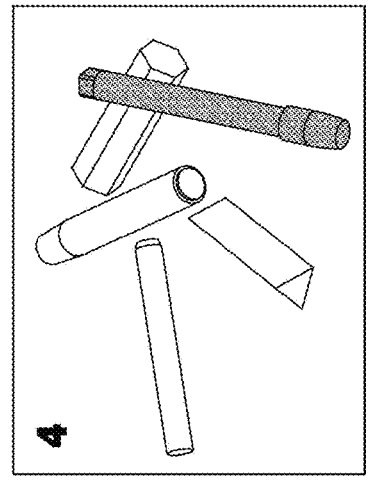

FIG. 29A
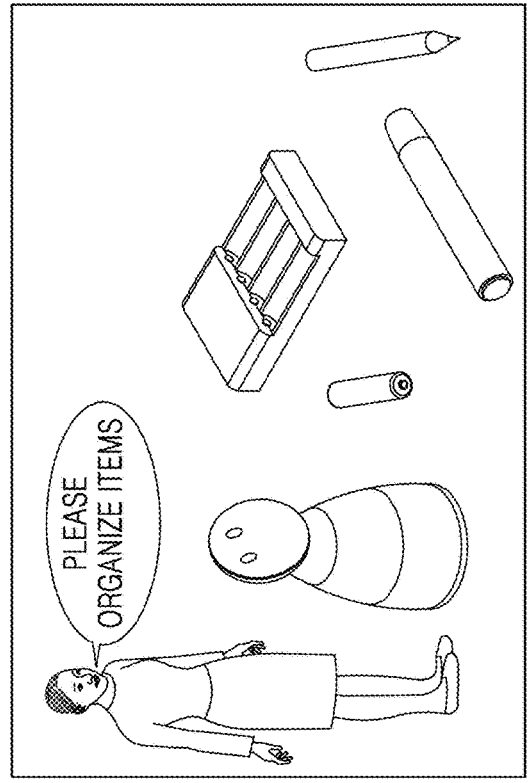
FIG. 29B
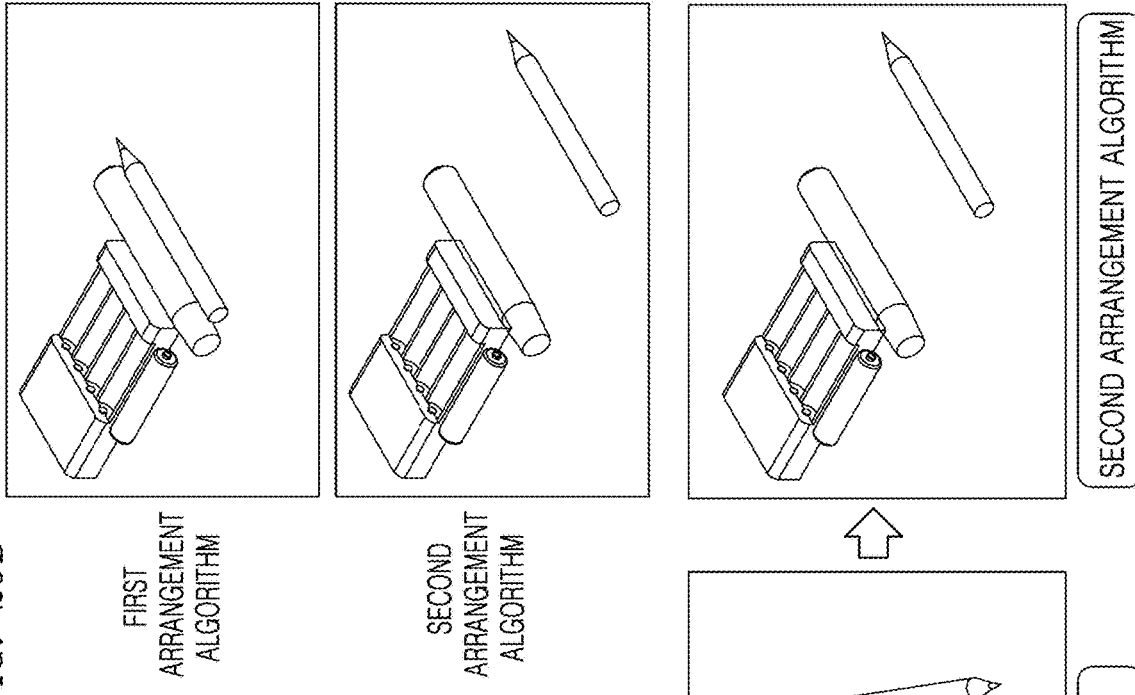
FIG. 29C
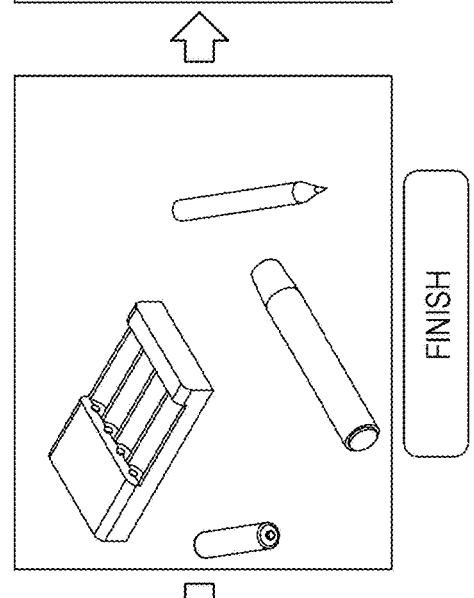
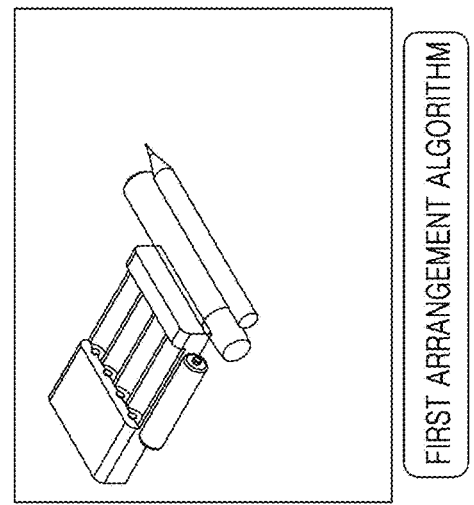

METHOD AND DEVICE FOR GENERATING IMAGE FOR ARRANGING OBJECTS

CROSS-REFERENCE TO RELATED APPLICATION(S)

This application is a continuation application, claiming priority under § 365(c), of an International application No. PCT/KR2021/004349, filed on Apr. 7, 2021, which is based on and claims the benefit of a Korean patent application number 10-2020-0042960, filed on Apr. 8, 2020, in the Korean Intellectual Property Office, the disclosure of which is incorporated by reference herein in its entirety.

BACKGROUND

1. Field

The disclosure relates to a system and method for interaction between human beings and devices (e.g., robots) in a household environment. More particularly, the disclosure relates to a method and device for guiding a user to rearrange household products or personal belongings.

2. Description of Related Art

There is an increasing trend in robotics for home appliances. Currently, home robots in public market may include units for moving around in a house via a navigation, units for receiving video streams, and other sensors, such as heart rate monitors.

It is predicted that future robots in public market are likely to have a unit for physical interaction, such as a robot arm, a vacuum hand, or other units for physical interaction with objects. One of applications of the robot arm may include cleaning and rearranging of items.

Therefore, there is a need for research on a method by which a device organizes items by virtually rearranging the items.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for performing a simulation of rearranging a plurality of objects.

Another aspect of the disclosure is to provide a device and method for generating a virtual arrangement image in which a plurality of objects are rearranged.

Additional aspects will be set forth in part in the description which follows and, in part, will be apparent from the description, or may be learned by practice of the presented embodiments.

In accordance with an aspect of the disclosure, a method of generating, by a device, a virtual arrangement image in which a plurality of objects are rearranged is provided. The method includes obtaining an image of the plurality of objects, determining at least one of a visual characteristic, a physical characteristic, or a usability characteristic of each of the plurality of objects, based on the obtained image, generating data about a result of arranging the plurality of objects, based on at least one from the visual characteristic, the physical characteristic, or the usability characteristic, generating a virtual arrangement image in which the plurality of objects are arranged based on the data about the result of arranging the plurality of objects, and displaying the virtual arrangement image.

In accordance with another aspect of the disclosure, a device for generating a virtual arrangement image in which a plurality of objects are rearranged is provided. The device includes a memory configured to store at least one instruction, and at least one processor configured to execute the at least one instruction and to control the device.

According to an embodiment of the disclosure, the usability characteristic includes at least one of a frequency of use with respect to each of the plurality of objects, information as to whether each object is a target to be arranged, information about a purpose of usage, or information about stability.

According to an embodiment of the disclosure, the generating of the data about the result of arranging the plurality of objects, based on at least one of the visual characteristic, the physical characteristic, or the usability characteristic, includes obtaining a frequency of use of a first object included in the plurality of objects, based on the usability characteristic, and determining a position of the first object based on the frequency of use.

According to an embodiment of the disclosure, the determining of the position of the first object based on the frequency of use includes, when the frequency of use of the first object is greater than a frequency of use of a second object, determining the position of the first object such that the first object is located closer to a user preference area than the second object.

According to an embodiment of the disclosure, the user preference area may be determined based on a distance between at least one area in which the plurality of objects are arranged and the device.

According to an embodiment of the disclosure, the determining of at least one of the visual characteristic, the physical characteristic, or the usability characteristic of each of the plurality of objects, based on the obtained image includes determining the frequency of use of each of the plurality of objects based on an amount of position movement of each of the plurality of objects.

According to an embodiment of the disclosure, the determining of the frequency of use for each of the plurality of objects includes tracking a change in the position of the first object included in the plurality of objects from at least one image, determining an amount of position movement of the first object based on information about position change of the first object, and determining the frequency of use of the first object based on the amount of position movement.

According to an embodiment of the disclosure, the generating of the data about the result of arranging the plurality of objects, based on at least one of the visual characteristic, the physical characteristic, or the usability characteristic, includes determining similarities between the first object included in the plurality of objects and the other objects, based on at least one of the visual characteristic, the physical characteristic, or the usability characteristic, and determining the position of the first object based on the similarities between the first object and the other objects.

According to an embodiment of the disclosure, the determining of the position of the first object based on the similarities with the other objects includes, when the similarity between the first object and the second object is greater than a similarity between the first object and the third object, determining the position of the first object such that the first object is located closer to the second object than the third object.

According to an embodiment of the disclosure, the generating of the data about the result of arranging the plurality of objects, based on at least one of the visual characteristic, the physical characteristic, or the usability characteristic, includes determining whether the first object is a target to be arranged, based on the usability characteristic of the first object included in the plurality of objects, and determining the position of the first object, based on whether the first object is the target to be arranged.

According to an embodiment of the disclosure, the generating of the virtual arrangement image in which the plurality of objects are arranged based on the data about the result of arranging the plurality of object includes generating the virtual arrangement image in which the first object is distinguished from objects that are targets to be arranged, when the first object is not the target to be arranged.

According to an embodiment of the disclosure, the displaying of the virtual arrangement image includes generating a user interface (UI) for selecting at least one virtual arrangement image, and the at least one virtual arrangement image includes an image in which the plurality of objects are virtually arranged based on different arrangement algorithms.

According to an embodiment of the disclosure, the displaying of the virtual arrangement image includes receiving an input for selecting one of the at least one virtual arrangement image, and generating a control signal for arranging the plurality of objects according to the selected virtual arrangement image.

According to an embodiment of the disclosure, the determining of at least one of the visual characteristic, the physical characteristic, or the usability characteristic of each of the plurality of objects, based on the obtained image includes identifying each of the plurality of objects based on the obtained image, and obtaining, from the database, the physical characteristic corresponding to each of the identified objects.

According to an embodiment of the disclosure, the method may further include determining a position of each of the plurality of objects in a virtual space based on an arrangement algorithm.

According to an embodiment of the disclosure, the determining of the position of each of the plurality of objects in the virtual space based on the arrangement algorithm includes assigning to a first virtual object the visual characteristic, the physical characteristic, or the usability characteristic corresponding to the first object included in the plurality of objects, and determining the position of the first virtual object in the virtual space based on the arrangement algorithm.

According to an embodiment of the disclosure, the determining of the position of the first virtual object in the virtual space based on the arrangement algorithm includes determining a force applied to the first virtual object in the virtual space, and determining the position of the first virtual object based on the force applied to the first virtual object.

According to an embodiment of the disclosure, the determining of the force applied to the first virtual object in the virtual space includes determining an attractive force applied between the first virtual object and a second virtual object in the virtual space based on the similarity between the first virtual object and the second virtual object.

According to an embodiment of the disclosure, the at least one processor may be configured to obtain an image of the plurality of objects, determine at least one of a visual characteristic, a physical characteristic, or a usability characteristic of each of the plurality of objects, based on the obtained image, generate data about a result of arranging the plurality of objects, based on at least one of the visual characteristic, the physical characteristic, or the usability characteristic, generate the virtual arrangement image in which the plurality of objects are arranged based on data about a result of arranging the plurality of objects, and display the virtual arrangement image.

According to an embodiment of the disclosure, the processor may be configured to obtain a frequency of use of a first object included in the plurality of objects based on the usability characteristic, and determine a position of the first object based on the frequency of use.

According to the disclosure, there is an effect of performing a simulation in which a plurality of objects are rearranged.

According to the disclosure, there is an effect of generating a virtual arrangement image in which a plurality of objects are rearranged.

Other aspects advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram schematically describing an operation according to an embodiment of the disclosure;

FIG. 2 is a diagram illustrating a method of generating, by a device, a virtual arrangement image in which a plurality of objects are rearranged, according to an embodiment of the disclosure;

FIG. 8 is a diagram illustrating a similarity determined between objects according to an embodiment of the disclosure;

FIGS. 29A, 29B, and 29C are diagrams illustrating a method of performing, by a device, rearrangement of objects located in a certain region, according to various embodiments of the disclosure.

The same reference numerals are used to represent the same elements throughout the drawings.

DETAILED DESCRIPTION

Figure 3A:
FIGS. 3A and 3B are diagrams illustrating an image of a plurality of objects, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "-unit" as used in embodiments of the disclosure means a software or hardware component, such as a field-programmable gate array (FPGA) or an application specific integrated circuit (ASIC), and the "-unit" performs any functions. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card. The "unit", in an embodiment of the disclosure, may include at least one processor.

FIG. 1 is a diagram schematically describing an operation according to an embodiment of the disclosure.

According to the disclosure, a method of organizing items that are not organized may be disclosed. Here, a device 100 may generate a virtual arrangement image in which a plurality of items are rearranged.

Referring to FIG. 1, items may exist non-organized in a certain space. For example, when personal belongings are not organized in a living room floor, or the like, of a house where people are living, the disclosure may be used to organize the items.

The disclosure may be used, in non-limited examples, in household robots, AR glasses, mobile communication devices, Internet of things (IoT), other electronic appliances.

The device 100 according to an embodiment of the disclosure may be implemented in various types. For example, the device 100 may be implemented as various electronic devices, e.g., a smart television (TV), a set-top box, a mobile phone, a tablet personal computer (PC), a digital camera, a laptop computer, a desktop computer, an E-book terminal, a digital broadcasting terminal, a personal digital assistant (PDA), a portable multimedia player (PMP), a navigation device, a moving picture experts group (MPEG-1 or MPEG-2) audio layer 3 (MP3) player, a wearable device, AR glasses, robots, or the like. In addition, in an IoT environment, all electronic appliances may be connected to another electronic appliances, for example, the device may be connected to a surveillance camera, a microphone, or the like. However, the device 100 is not limited to the above examples, and may include any of devices provided that the device may receive commands for interaction between humans and computers. The device 100 may include any type of devices provided that a simulation for rearranging items may be performed. In addition, the device 100 may include any type of devices provided that the device may display a few options for rearranging items generated through simulation to a user.

According to an embodiment of the disclosure, the device 100 may include a robot 120 having an arm for organizing items according to simulation result. Here, the device 100 may organize the items according to generated virtual arrangement image, according to a selection of the user.

According to an embodiment of the disclosure, when the device 100 is AR glasses 130, the AR glasses worn on the user may capture images of peripheral environment. The AR glasses 130 may carry out a simulation of rearranging items based on captured images. In addition, the AR glasses 130 may display a selection interface to the user, the selection interface being generated based on a result of simulation in which items are rearranged. Here, the device 100 may transmit a command to an external device so that the external device may organize the items according to the generated virtual arrangement image, according to a selection of the user.

Here, the external device may denote an additional device separate from the device 100. The external device may move the items according to the result of the item rearrangement simulation of the device 100, based on a control signal received from the device 100.

In the disclosure, the device 100 may carry out a simulation of arranging the items according to an arrangement algorithm. For example, according to the result of simulation according to the arrangement algorithm, locations of respective items may be determined to be new locations different from the existing locations. Here, the device 100 may carry out the simulation and determine directions, angles, or the like, in which items are placed, as well as the locations of the items. Hereinafter, for convenience of description, determining of the new locations, directions, angles, or the like, of the items as described above will be described as rearranging, arranging, organizing, or the like, of the items in the disclosure.

For convenience of description, an example in which the device 100 includes a robot 120 having a robot arm that may move the items will be described below. There may be indefinite methods for the robot 120 of rearranging (hereinafter, arrangement algorithms) non-organized items.

Referring to FIG. 1, items may be organized according to each arrangement algorithm. As a non-limiting example, a first arrangement algorithm of FIG. 1 may show a state in which items are organized according to classes of the items. According to the first arrangement algorithm, markers are arranged close to one another and then batteries are arranged close to one another, based on classes of the items.

In addition, a second arrangement algorithm of FIG. 1 shows a state in which items are organized so that gaps among the items may be minimized based on volumes of the organized items. According to the second arrangement algorithm, the items are arranged to be stacked sequentially so that the gaps among the items may be minimized.

Here, non-limiting examples of the method (arrangement algorithm) of rearranging the items may include a method of organizing (compact arrangement) without generating gaps based on space element, a method of organizing items based on aesthetic element, a method of organizing items based on convenience, or the like.

In addition, when the robot 120 rearranges the items, the usability features of the items need to be considered. In more detail, when the robot 120 rearranges the items, a case in which a certain item may not be moved has to be considered. For example, when an item is a cup filled with water, the cup filled with water may not be placed horizontally. For example, when the robot 120 carries out the above operation, the item of the user may be damaged. For example, a certain item may not be moved due to various reasons, for example, when the item is attached to a certain space via an adhesive, when it is dangerous to move the item (e.g., glass bottle with open lid and filled with water), or the like. In addition, the user would not move the item when the item is suitable for the current position. Therefore, in order for the robot 120 to arrange the items, a usability property of an object needs to be considered. In addition, the usability property of the object in the disclosure may denote a habit property of the object as described above.

The disclosure provides a plurality of embodiments of a method of arranging items (hereinafter, objects) that are not arranged and the device 100 for arranging the objects that are not arranged. According to an embodiment of the disclosure, the device 100 may receive a command from the user so that the objects located in a certain area are to be rearranged. In addition, the device 100 may capture at least one image (two-dimensional (2D) or red, green, blue, distance (RGBD)) of the certain area.

According to an embodiment of the disclosure, the device 100 may carry out a semantic segmentation with respect to the objects in at least one image. The device 100 removes segmented objects from the image one by one, and fills gaps through inpainting. The device 100 may repeatedly carry out the above operation until there is no object remaining as a segment.

According to an embodiment of the disclosure, the device 100 may perform a 3D reconstruction of the objects on the area and a 3D object that may not be moved, such as a plane, or the like. The device 100 may calculate rearrangement of at least two possible 3D objects in an area that is reconstructed as 3D. The device 100 may render at least two possible rearrangements as bitmap images of video files.

In addition, the disclosure provides a plurality of embodiments about a user interface for selecting one of methods of arranging a plurality of items generated by the device 100. At least two possible rearrangements may be suggested to the user.

According to an embodiment of the disclosure, the device 100 may receive a selection between at least two possible rearrangements from the user. In addition, the device 100 may send a command to the robot (external device 100) in order to carry out the selected rearrangement of the belongings (items). Alternatively, the device 100 may perform the selected rearrangement.

According to an embodiment of the disclosure, the device 100 may perform a function of recognizing an object as 3D, a function of visualizing objects, and a function of physically modeling the objects.

According to an embodiment of the disclosure, a two-dimensional (2D) approach for visualization may be used to require an inpainting technology for carrying out reconstruction of closed parts of objects.

According to an embodiment of the disclosure, the device 100 may use an end-to-end deep learning approach for 3D reconstruction of object templates and perfect scene understanding.

According to an embodiment of the disclosure, the device 100 may perform semantic understanding with respect to a scene (e.g., obtained image), and may obtain an optimal rearrangement result that may apply to personal belongings.

The disclosure will be described in more detail later.

FIG. 2 is a diagram illustrating a method of generating, by a device, a virtual arrangement image in which a plurality of objects are rearranged, according to an embodiment of the disclosure.

According to an embodiment of the disclosure, the device 100 may provide a method of planning rearrangement of a plurality of physical objects in a home environment.

The items described above with reference to FIG. 1 may correspond to objects of FIG. 2. In the disclosure, the object may denote an item that is irregularly located in a certain space that has to be organized by the device 100. Here, there is no limitation in kinds, characteristics, or the like, of the items corresponding to the objects. The plurality of objects may be located on a shelf, a floor, a chair, a table, or the like, and are not limited to the above examples. In addition, the objects in the disclosure may have different shapes and sizes from one another.

In operation S210, the device 100 may obtain images with respect to a plurality of objects.

According to an embodiment of the disclosure, the device 100 may obtain captured images of the plurality of physical objects from an external device. For example, an external device connected wirelessly or via wires to the device 100 captures images of the plurality of physical objects and transfers the captured images to the device 100.

According to another embodiment of the disclosure, the device 100 may capture at least one image with respect to the plurality of physical objects.

In the disclosure, an image or a picture may denote a still image, a moving picture consisting of a plurality of successive still images (or frames), or a video. For example, in the disclosure, an image may denote a red, blue, and green (RBG) or red, green, blue, distance (RGBD) image.

For example, the device 100 may capture only one image of the plurality of objects.

In another example, the device 100 may capture a plurality of images with respect to the plurality of objects. When the device 100 obtains one or more images with respect to the plurality of objects, the device 100 may additionally recognize physical and visual characteristics of an object.

According to an embodiment of the disclosure, the device 100 may capture a plurality of images with respect to the plurality of objects at different times. In a non-limiting example, the device 100 may obtain images with respect to the plurality of objects twice a day for a month. In this case, the device 100 may capture images of the objects of the same layout a plurality of times, and may obtain additional usability characteristics of the objects.

According to an embodiment of the disclosure, the images with respect to the objects may be captured from different positions in order to improve visual characteristics of the objects obtained by the device 100. Here, the visual characteristics of the objects may denote information about shapes, textures, sizes, or the like, of the objects.

In addition, the images with respect to the objects may be captured from different positions in order to improve physical characteristics of the objects obtained by the device 100. Here, the physical characteristics of the objects may denote information about weights, frictional coefficients, weight distribution, whether to be bendable or not, stretchability, or the like, of the objects.

According to an embodiment of the disclosure, images of the plurality of objects that are not aligned may include images captured under various conditions. In more detail, the RGB image and the RGBD image may be captured under photographing conditions combining various photographing times, various photographing angles, and various photographing light conditions.

The objects may be entirely shown at a certain angle. In addition, the objects may be partially hindered by another object at another angle. Therefore, the device 100 needs to obtain images about the plurality of objects captured in various photographing angles.

Figure 3B:
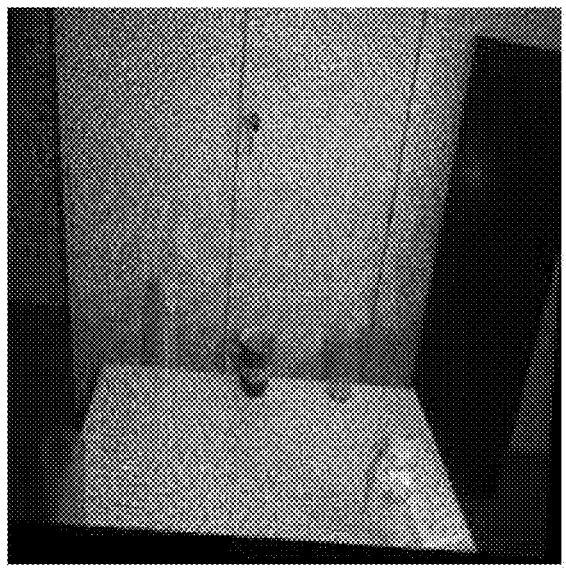

FIGS. 3A and 3B are diagrams illustrating an image of a plurality of objects, according to various embodiments of the disclosure.

According to an embodiment of the disclosure, the device 100 may include an RGB and infrared ray (IR) camera.

According to an embodiment of the disclosure, the illumination conditions may be changed by applying various illumination technologies. This is a method of improving the way of recognizing the objects by the device 100. Non-limiting examples of the above illumination conditions may include turning-on/off of a lamp located on the main body of the device 100 (e.g., robot), using of structured light, using of a time-of-flight (ToF) type light, using of light in various spectrum bands, such as a multispectral light and a hyperspectral light without limiting to white, red, green, and blue light, and using of modulated light, or the like.

FIG. 3A denotes an image of a ToF type obtained by an RGBD camera. FIG. 3B may denote an image of structured light obtained by an RGBD camera.

Referring to FIG. 2, in operation S220, the device 100 may determine at least one of visual characteristic, physical characteristic, or usability characteristic of each of the plurality of objects based on obtained images.

In operation S220, the objects may be recognized by the device 100. Here, a result of recognizing the objects by the device 100 may be defined as at least one of the visual characteristic of each object, physical characteristic of the object, or usability characteristic of the object.

In the disclosure, the visual characteristic of the object may denote a shape, a size, a texture, an optical characteristic, such as reflecting surface, or the like, of the object.

In the disclosure, the physical characteristic of the object may denote a weight, a weight distribution, bending or stretching capability, frictional coefficient, or the like, of the object.

In the disclosure, the usability characteristic of the object may denote information about whether to change the position of the object and position changing frequency of the object, frequency of use, whether the object is a garbage (whether to remove the object or not), the usage of the object, whether it is safe when the object is inclined or held, or the like.

According to an embodiment of the disclosure, the device 100 may identify each of the plurality of objects based on the obtained image. In addition, characteristic of each identified object may be determined.

A method of determining the usability characteristic of each of the plurality of objects by the device 100 based on the obtained image will be described in detail with reference to following drawings (FIGS. 14, 15A, 15B, 16, and 17).

According to an embodiment of the disclosure, the device 100 may obtain a parameter about the physical characteristic corresponding to each object from a database, in order to determine the physical characteristic of each of the plurality of objects based on the obtained image. In addition, the device 100 may generate parameter about the physical characteristic of each object as a text label.

Figures 4A, 4B:
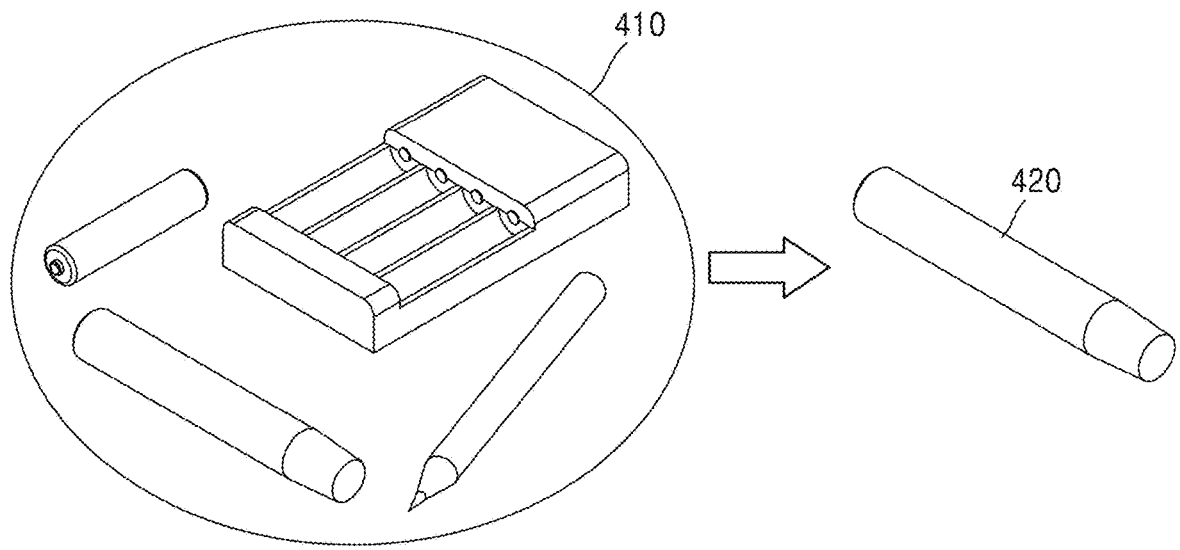
FIGS. 4A and 4B are diagrams for describing a text label according to various embodiments of the disclosure.

FIGS. 4A and 4B are diagrams for describing a text label according to various embodiments of the disclosure.

As described above, the objects may be described as text labels. In particular, the text label may be used to search the database for the parameter about the average physical characteristic, such as a weight, frictional coefficient, or the like, of the object.

Referring to FIG. 4A, it illustrates a plurality of objects 410 and a flipchart marker 420 that is one of the plurality of objects 410.

Referring to FIG. 4B, it illustrates a text label in which physical parameters of the flipchart marker 420 are organized.

Referring to FIG. 4B, an average weight of the flipchart marker 420 is 15 g, a frictional coefficient is 0.2, a center of mass is a center, there are no bendable property, no stretchable property, and no danger. For example, it may be identified that the flipchart marker 420 has the physical characteristics as shown in FIG. 4B.

FIG. 4B shows the text label about the flipchart marker 420 that is one of the plurality of objects 410, but is not limited thereto. For example, the text label may store the physical parameters with respect to each of the plurality of objects 410.

In another embodiment of the disclosure, an end-to-end deep neural network may be trained for all predictions in an end-to-end deep manner.

In addition, the method of determining the physical characteristics of the objects is not limited to the above example.

Referring to FIG. 2, in operation S230, the device 100 may generate data about a result of arranging the plurality of objects based on at least one of the visual characteristic, the physical characteristic, or the usability characteristic.

According to an embodiment of the disclosure, the device 100 may obtain a frequency of use of a first object included in the plurality of objects, based on the usability characteristic. In addition, the device 100 may determine the position of the first object based on the frequency of use. For example, when the device 100 determines the position of the first object based on the frequency of use, the device 100 may determine the position of the first object so that the first object is closer to a user preference area than a second object, in a case in which the usage frequency of the first object is greater than that of the second object. Here, the first object and the second object may denote arbitrary objects included in the plurality of objects. This will be described in more detail below with reference to FIGS. 13, 14, 15A, 15B, 16 to 18, 19A to 19C, and 20.

According to an embodiment of the disclosure, the device 100 may determine similarity between the first object and another object included in the plurality of objects, based on at least one of the visual characteristic, the physical characteristic, or the usability characteristic. In addition, the device 100 may determine the position of the first object based on the similarity to another object.

For example, when the position of the first object is determined based on the similarity to the other objects, the device 100 may determine the position of the first object so as to be closer to the second object than a third object when the similarity between the first object and the second object is greater than that between the first object and the third object. Here, the first object, the second object, and the third object may denote arbitrary objects included in the plurality of objects. This will be described in more detail below with reference to FIGS. 7 to 9, 10A, 10B, and 11.

According to an embodiment of the disclosure, the device 100 may determine whether the first object is a target to be arranged based on the usability characteristic of the first object included in the plurality of objects. In addition, the device 100 may determine the position of the first object based on whether the first object is a target to be arranged. This will be described in more detail below with reference to FIGS. 12A and 12B.

According to an embodiment of the disclosure, the device 100 may determine the position of each of the plurality of objects in a virtual space based on an arrangement algorithm. This will be described below with reference to FIGS. 5A and 5B.

In addition, the device 100 may generate a first virtual object corresponding to the first object included in the plurality of objects. In the disclosure, a virtual object with respect to each of the plurality of objects may be generated, and the virtual object may correspond to a 3D object used to carry out a simulation. This will be described in more detail below with reference to FIGS. 24, 25A to 25C, 26, 27A, 27B, and 28.

For example, when the position of each of the plurality of objects is determined in a virtual space based on the arrangement algorithm, the device 100 may assign to the first virtual object the visual characteristic, the physical characteristic, or the usability characteristic corresponding to the first object included in the plurality of objects. In addition, the device 100 may determine the position of the first virtual object in the virtual space based on the arrangement algorithm. This will be described below with reference to FIGS. 5A and 5B.

For example, when the position of the first virtual object in the virtual space is determined based on the arrangement algorithm, the device 100 may determine a force applied to the first virtual object in the virtual space. In addition, the device 100 may determine the position of the first virtual object based on the force applied to the first virtual object.

For example, when the force applied to the first virtual object in the virtual space is determined, the device 100 may determine an attractive force applied between the first virtual object and a second virtual object in the virtual space based on the similarity between the first virtual object and the second virtual object. This will be described below with reference to FIGS. 7 to 9, 10A, and 10B.

For example, the device 100 may perform a simulation about how the virtual objects to which extracted characteristics are assigned are arranged according to the arrangement algorithm in the virtual space, by using a 3D simulation. In more detail, the device 100 may carry out at least one preset of repositioning with respect to the plurality of recognized physical objects.

In the disclosure, the preset of repositioning may denote performing of a simulation for generating virtual objects corresponding respectively to the plurality of objects, and arranging the virtual objects in a virtual space according to the arrangement algorithm based on determined characteristics and features of the virtual space. For example, the preset of repositioning may denote arranging of the 3D objects (virtual objects) at different positions from initial positions of the objects. In addition, the preset of repositioning may be performed according to each arrangement algorithm and may correspond to each option that a user may select.

In the disclosure, the preset of repositioning may be performed by a virtual physical simulation. The preset of repositioning may be carried out by using at least one of the physical characteristic of the object, the visual characteristic of the object, or the usability characteristic of the object.

According to an embodiment of the disclosure, there may be one or more presets of repositioning. For example, a first preset of repositioning may be performed via a simple 3D object positioning that will be described later, and another preset of repositioning of the objects may be performed via a physical 3D simulation.

In a preferred embodiment of the disclosure, the preset of repositioning may be performed through a physical simulation about positions of the 3D objects (virtual objects).

In a simple example embodiment of the disclosure, the 3D objects may be arranged in 3D-rendering software. Here, the 3D-rendering software may denote software having a function of setting simple gravity and integrated frictional coefficients for all objects, and in a non-limiting embodiment of the disclosure, the 3D-rendering software may include Blender©. According to an embodiment of the disclosure, the 3D objects may be arranged one by one on a plane. In addition, a simulation may be performed so that the 3D objects may fall on a plane by gravity from a point located higher than the plane. Through this process, the objects may be arranged very close to one another. The above simulation method may be an embodiment in which the simulation is performed in a simplest way. After this process, in another embodiment of the disclosure, a virtual vertical wall may hold the plurality of objects together. This will be described in more detail below with reference to the drawings below.

Referring to FIG. 2, in operation S240, the device 100 may generate a virtual arrangement image in which the plurality of objects are organized according to an arrangement algorithm, based on the data about the organization result.

In more detail, the device 100 may render a result of at least one preset of repositioning as at least one visual representation based on at least one of the physical characteristic, the visual characteristic, or the usability characteristic of the object. Here, each of at least one visual representation may correspond to at least one preset of repositioning.

The objects rearranged by a simulator according to the above-described method may be visually rendered based on various software, such as Blender, or the like.

Figure 5A:
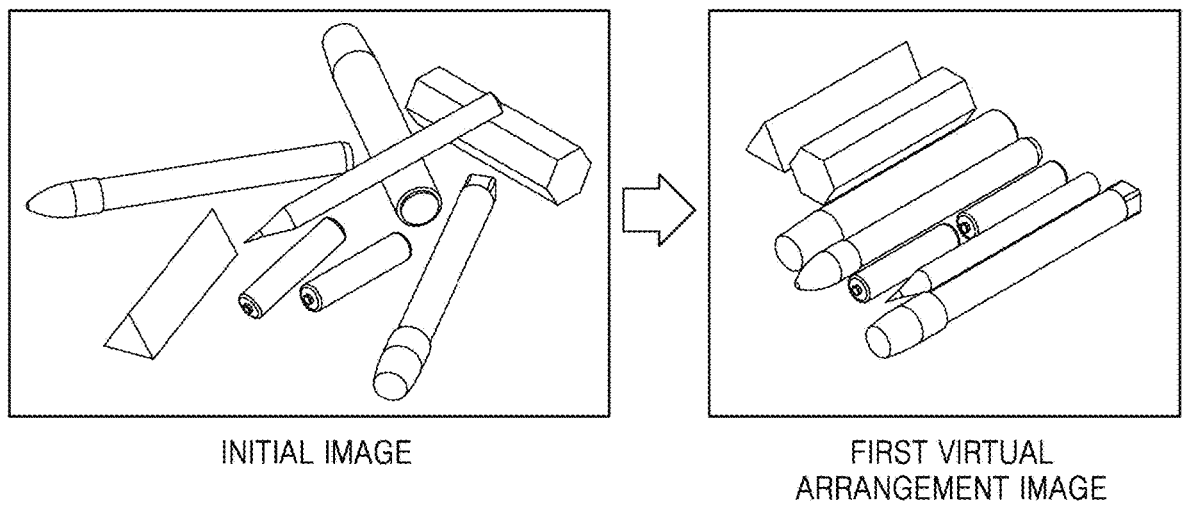
FIGS. 5A and 5B are diagrams illustrating virtual arrangement images in which a plurality of objects are arranged, according to various embodiments of the disclosure.
Figure 5B:
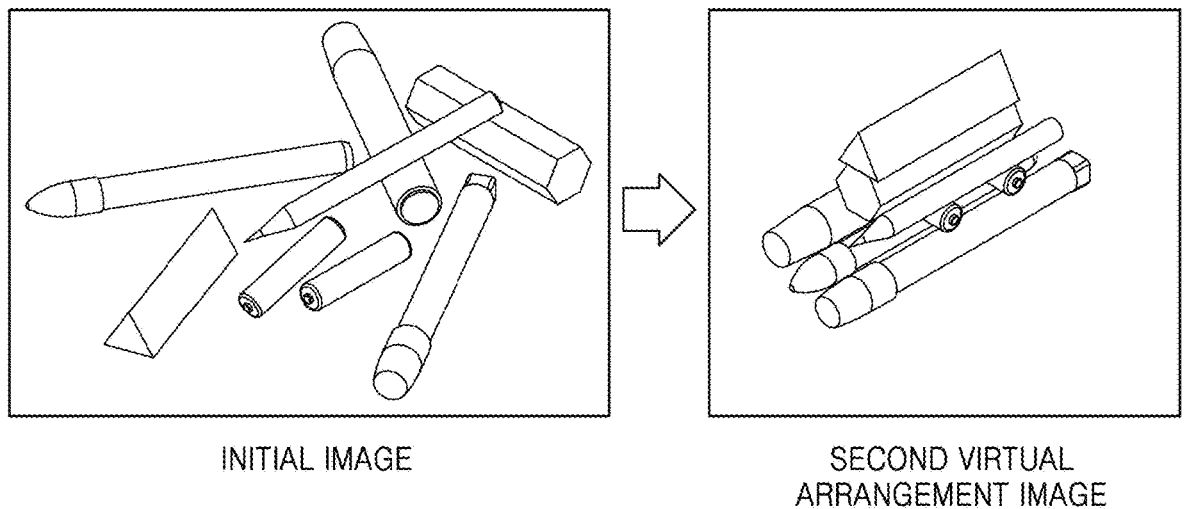

FIGS. 5A and 5B are diagrams illustrating virtual arrangement images in which a plurality of objects are arranged, according to various embodiments of the disclosure.

Referring to FIGS. 5A and 5B, operations S230 and S240 of FIG. 2 will be described in more detail.

In operation S230, the device 100 may generate virtual objects with respect to the plurality of objects in order to generate the data about a result of arranging the plurality of objects based on at least one of the visual characteristic, the physical characteristic, or the usability characteristic. This will be described in more detail later with reference to FIGS. 24, 25A to 25C, 26, 27A, 27B, and 28.

The device 100 may arrange the virtual objects in the virtual space according to the arrangement algorithm. For example, the device 100 may apply at least one arrangement algorithm (e.g., rearrangement algorithm) to the virtual objects that are reconstructed in 3D. Here, the device 100 may generate data about the result of organizing the plurality of objects according to the arrangement algorithm, based on the arrangement result in the virtual space.

According to an embodiment of the disclosure, the arrangement algorithm may include a semantic similarity-based algorithm, a color similarity-based algorithm, a compactness-based algorithm, or the like.

After that, in operation S240, the device 100 may generate a virtual arrangement image in which the plurality of objects are arranged based on the data about the result of arranging the plurality of objects, and FIGS. 5A and 5B may correspond to the virtual arrangement image.

Referring to FIG. 5A, a left image in FIG. 5A may show an image of the plurality of objects (initial image) obtained by the device 100 in operation S210. In addition, the device 100 may arrange the virtual objects in the virtual space according to the first arrangement algorithm. For example, in this process, the device 100 may carry out a 3D simulation with respect to the virtual objects according to the first arrangement algorithm. For example, when the first arrangement algorithm is a similarity-based algorithm, the device 100 may generate a first virtual arrangement image as shown in the right image of FIG. 5A. For example, referring to the right image of FIG. 5A, it is identified that objects of similar types are arranged close to one another.

Likewise, referring to FIG. 5B, the device 100 may arrange the virtual objects in the virtual space according to the second arrangement algorithm. For example, when the second arrangement algorithm is a compactness-based algorithm, the device 100 may generate a second virtual arrangement image as shown in the right image of FIG. 5B.

In operation S250, the device 100 may display the virtual arrangement image.

When the virtual arrangement image is displayed, the device 100 may generate a user interface (UI) for selecting at least one virtual arrangement image. Here, the at least one virtual arrangement image may include an image in which the plurality of objects are virtually arranged based on different arrangement algorithms.

According to an embodiment of the disclosure, the device 100 may display at least one virtual arrangement image corresponding to each arrangement algorithm. In addition, the device 100 may receive, from a user, an input for selecting one of at least one virtual arrangement image displayed thereon.

This will be described in more detail below with reference to FIGS. 21 to 24, and 25A to 25C.

Figure 6:
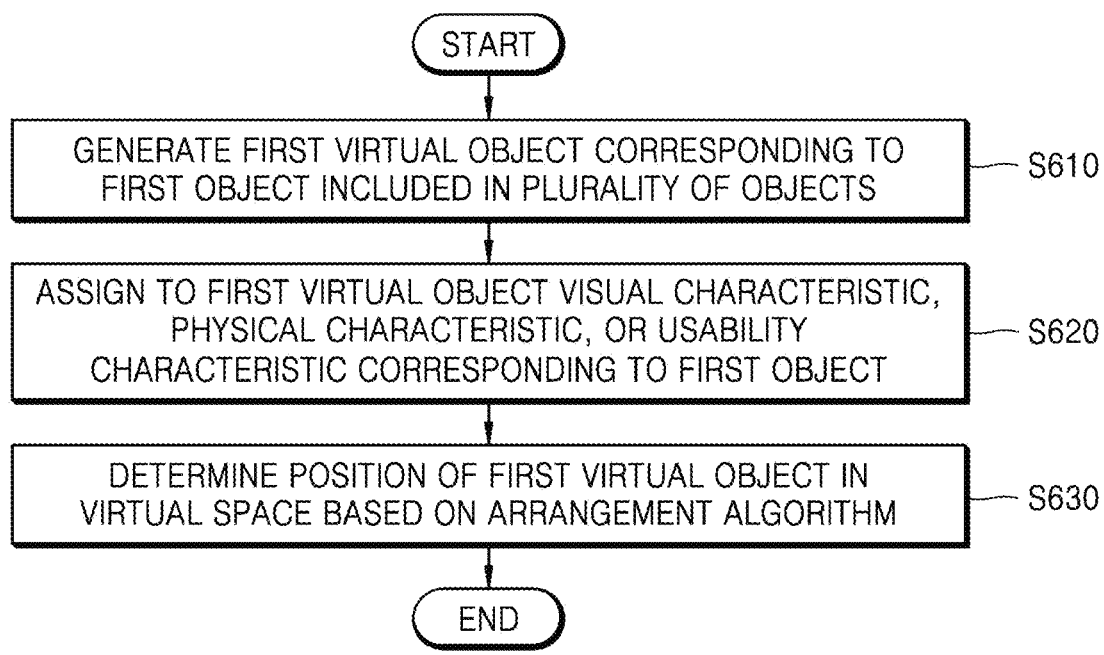
FIG. 6 is a flowchart illustrating processes of performing a three-dimensional (3D) simulation by a device according to an embodiment of the disclosure.

FIG. 6 is a flowchart illustrating processes of performing a 3D simulation by a device, according to an embodiment of the disclosure.

Referring to FIG. 6, the device 100 may determine the position of each of the plurality of objects in a virtual space based on an arrangement algorithm.

In operation S610, the device 100 may generate a first virtual object corresponding to the first object included in the plurality of objects.

In the disclosure, the virtual object may denote a 3D virtual object generated by the device for carrying out the 3D simulation in the virtual space, and may correspond to an actual object. The method of generating the virtual object will be described in more detail below with reference to FIGS. 24, 25A to 25C, 26, 27A, 27B, and 28.

In operation S620, the device 100 may assign the visual characteristic, the physical characteristic, or the usability characteristic corresponding to the first object included in the plurality of objects, to the first virtual object.

In operation S630, the device 100 may determine the position of the first virtual object in the virtual space based on the arrangement algorithm.

In the disclosure, the virtual space may denote a space for performing the 3D simulation. New positions of the objects may be determined by changing a force applied to the object in the virtual space and a force applied between objects in the virtual space.

Figure 7:
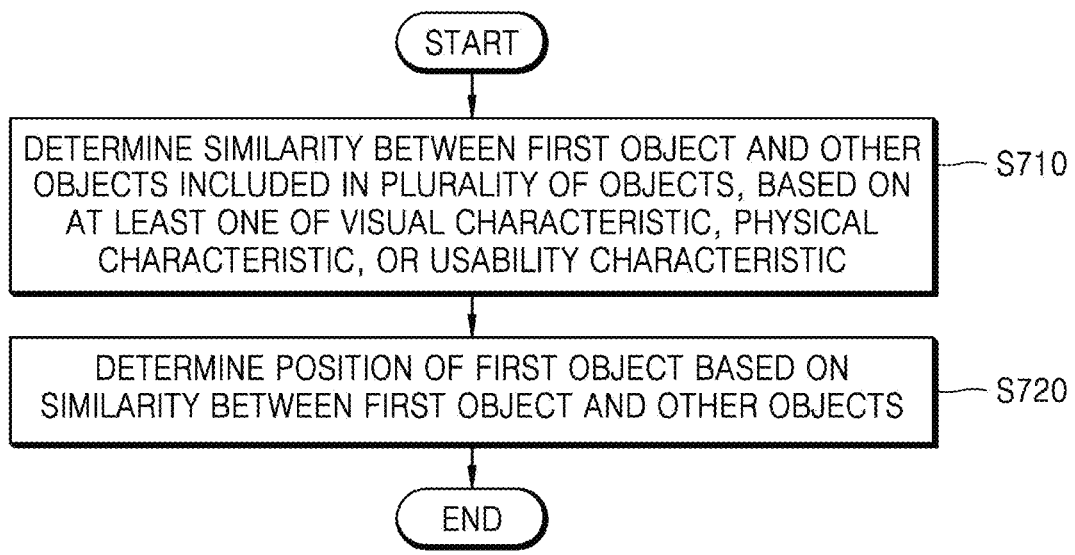
FIG. 7 is a flowchart illustrating a method of performing a simulation taking into account a similarity between objects according to an embodiment of the disclosure.

FIG. 7 is a flowchart illustrating a method of performing a simulation based on a similarity between objects, according to an embodiment of the disclosure.

FIG. 7 may show a detailed example embodiment of operation S230 shown in FIG. 2 described above.

Referring to FIG. 7, it may show a case in which the plurality of objects are arranged based on similarity between the objects.

According to an embodiment of the disclosure, when the device 100 performs the simulation of rearranging the objects, the device 100 may generate data about a result of arranging the plurality of objects according to the arrangement algorithm by using the semantic similarity between the objects.

Here, the similarity between the plurality of objects may denote a value or a figure representing a degree of similarity between the objects. In addition, the similarity may denote the semantic similarity described above.

In operation S710, the device 100 may determine similarity between the first object and another object included in the plurality of objects, based on at least one of the visual characteristic, the physical characteristic, or the usability characteristic.

Here, the first object may denote an arbitrary object included in the plurality of objects.

For example, when there are N objects, n*(n−1)/2 pairwise semantic similarities may exist between pair of the objects. In order to use the semantic similarity between the objects, characteristics of the objects have to be appropriately recognized. Here, as described above, the usability characteristic of the object may be recognized, and in particular, functions of the object represented as the 3D object (virtual object), or the like, have to be recognized. The semantic similarity according to the function of the object may denote that, for example, a marker and a pen are more similar than a marker and a nail.

In operation S720, the device 100 may determine the position of the first object, based on similarities between the first object and other objects.

According to an embodiment of the disclosure, when the position of the first object is determined based on the similarity to the other objects, the device 100 may determine the position of the first object so as to be closer to the second object than a third object when the similarity between the first object and the second object is greater than that between the first object and the third object.

FIG. 8 is a diagram illustrating a similarity determined between objects, according to an embodiment of the disclosure.

According to an embodiment of the disclosure, the device 100 may obtain names of the objects when the similarities between the plurality of objects are determined based on the determined characteristics. In addition, the device 100 may determine the similarity between the objects based on the names of the objects.

For example, for example, the similarity between the objects may be determined according to natural language similarity. For example, a cosine similarity between two words may be calculated in order to determine the natural language similarity, and in a non-limiting embodiment of the disclosure, the cosine similarity between two words may be calculated by using GloVe NLP.

Referring to FIG. 8, pairwise distances of four words, i.e., "marker", "pen", "battery", and "charger" are shown.

The physical force (e.g., attractive force) applied between the virtual objects in the virtual space may be in proportional to the semantic similarity. According to an embodiment of the disclosure, the physical force, e.g., the attractive force, between the objects may become a criterion for positioning an object to be close to or far from another object, when the objects are arranged. For example, when the physical force, e.g., the attractive force, between two objects is large, the objects having large attractive force may be located adjacent to each other. In addition, when the physical force, e.g., the attractive force, between two objects is small, the objects having small attractive force may be located far from each other.

For example, the attractive force applied between the first virtual object and the second virtual object in the virtual space may be determined based on the similarity between the first virtual object and the second virtual object. In more detail, the attractive force applied between the first virtual object and the second virtual object in the virtual space may be determined in proportional to the similarity between the first virtual object and the second virtual object.

In some example embodiments of the disclosure, the physical object between two objects may be determined by Equation below.

$$F_1(t)=a(t)d_{12}\min(m_1,m_2)^{2/3}$$ Equation 1

Here, a may denote a scaling coefficient, and in a non-limiting embodiment of the disclosure, when the simulation starts, a may be set to be 30 and may be set to be 0 when the simulation ends.

$d_{12}$ may denote a semantic similarity coefficient. For example, the semantic similarity coefficient may denote GloVe similarity between words or phrases that describe the objects by using a linear or empiric kind of monotonic increasing function. In a non-limiting embodiment of the disclosure, $d_{12}=\text{GloVe}(word1,word2)^3$ may be set.

In addition, $m_1$ may denote a mass of the first object and $m_2$ may denote a mass of the second object.

In the disclosure, a may denote a strength of an adhesion target to which the object is adhered together. This simulation step may be performed in a viscosity environment. Here, the frictional force may be in proportional to a speed (in order to prevent unnecessary vibration) during a dynamic simulation, and may be carried out in a non-gravity state that binds the objects to the surface.

In addition, a power of ⅔ may denote that, when there are many objects, a determinant may be the pressure. For example, this may denote proportion to the second power of an average size. On the contrary, it may be identified that the mass is in proportional to the third power of the average size.

In another embodiment of the disclosure, the force between the objects may not be determined by geometric sizes thereof. In this case, the physical force between the objects may be determined according to Equation below.

$$F_2(t)=a(t)d_{12}$$ Equation 2

In this case, the objects may start to attach to the other objects during the simulation, and a cluster of similar objects may be generated.

There may be a lot of methods of deriving the attractive characteristics by the objects in proportional to the semantic similarity, and the above two examples are merely example embodiments.

Figure 10A:
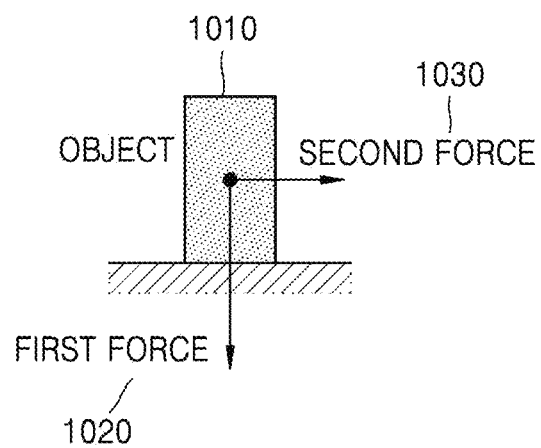
FIGS. 10A and 10B are graphs showing a relationship between physical forces considered when modeling positions of objects, according to various embodiments of the disclosure.
Figure 10B:
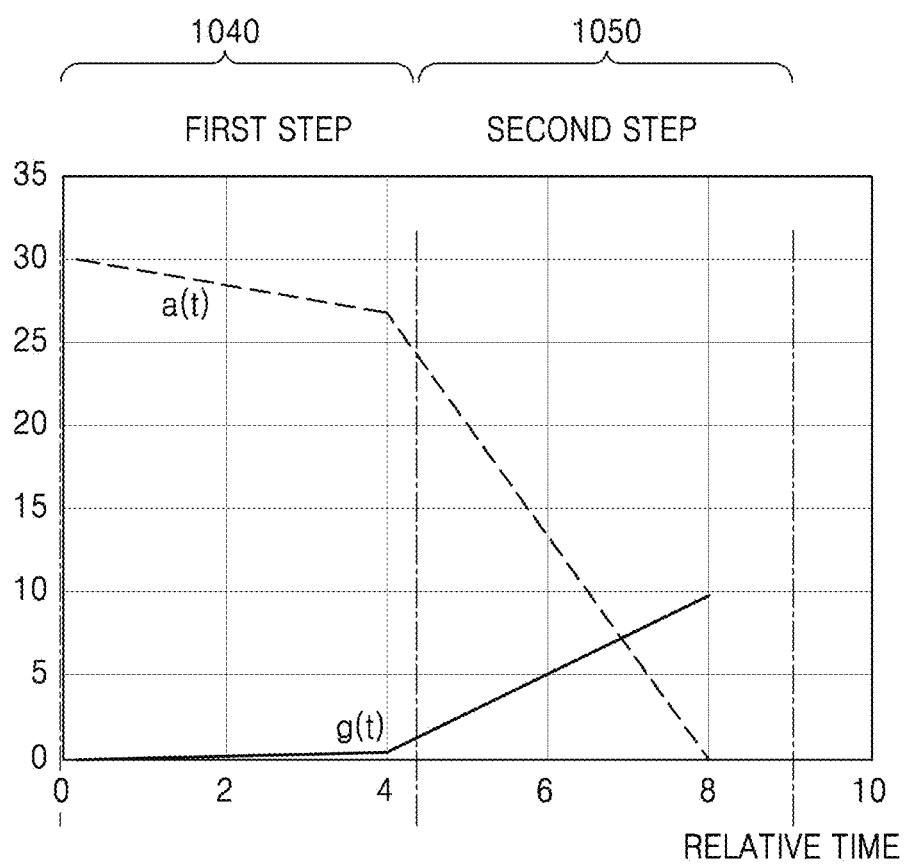

Referring to FIGS. 10A and 10B below, in a second step, the gravity applies preferentially over the force between objects, and the object is affected by the gravity, rather than the attractive force between the objects.

Figure 9:
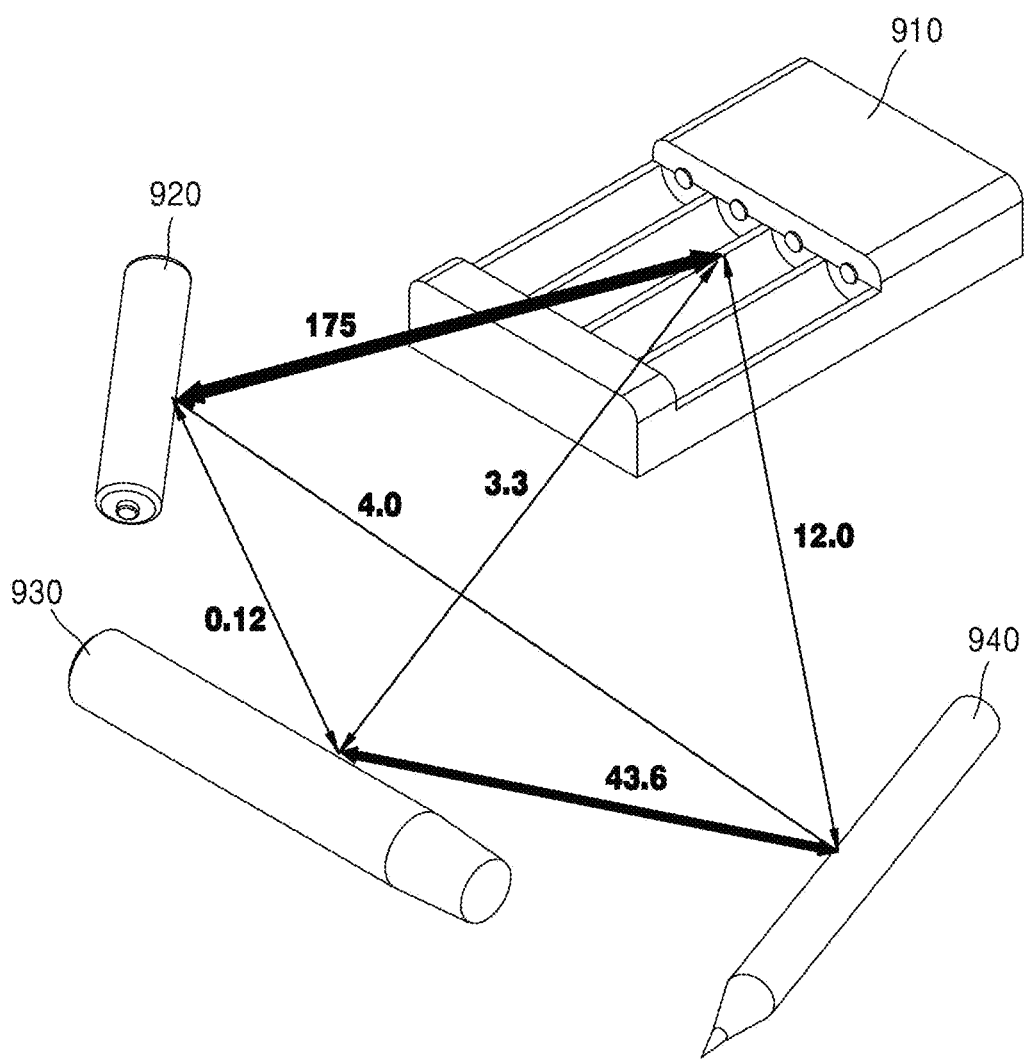
FIG. 9 is diagram illustrating physical force applied between objects, according to an embodiment of the disclosure.

FIG. 9 is diagram illustrating physical force applied between objects according to an embodiment of the disclosure.

Referring to FIG. 9, physical force applied among objects 910, 920, 930, and 940 is shown. In more detail, a value relating to the attractive force applied between the objects in FIG. 8 (e.g., F2/a(t)) is shown.

First, the device 100 may determine the similarity between the objects based on the characteristics. Here, the similarity between the objects may be in proportional to the attractive force applied between the objects.

Referring to FIG. 9, it may be identified that the force applied between a battery 920 and a charger 910 is 175 and the force applied between a pen 940 and a marker 930 is 43.6. The above values are greater than the forces applied between the other objects. For example, the force applied between the marker 930 and the battery 920 is 0.12 and the force applied between the marker 930 and the charger 910 is 3.3. As such, the device 100 may identify that the similarity between the battery and the charger is the largest.

In addition, it is also identified that the similarity between the pen and the marker has next largest value.

Here, the similarity may correspond to a relative value. In particular, it needs to relatively determine how the first object has a similarity with other objects based on one object (e.g., first object).

Referring to FIG. 9, that is, based on the battery 920, the object having the largest similarity is the charger 910. On the other hand, based on the marker 930, the marker has the attractive value 43.6 with the pen 940, which is smaller than 175, but for the marker, the similarity with the pen is the largest. Therefore, it may be determined that the object having the largest similarity with the marker is the pen.

The device 100 may generate data about a result of organizing the plurality of objects in the virtual space based on deducted values (similarities). For example, the device 100 may arrange the objects having the large similarity to be close to each other. Referring to FIG. 9, the device 100 may generate data so that the marker and the pen are located adjacent to each other and may generate data so that the charger and the battery are located adjacent to each other. In addition, the device 100 may align the plurality of objects so that the objects having smaller similarity value are located far from each other.

Consequently, as shown in FIG. 9, arranging the objects having the high similarities adjacent to each other may be an embodiment for improving user convenience.

FIGS. 10A and 10B are graphs illustrating a relationship between physical forces considered when modeling positions of objects according to various embodiments of the disclosure.

Referring to FIG. 10A, a first force 1020 and a second force 1030 may be applied to an object 1010. According to an embodiment of the disclosure, the first force 1020 may be the gravity applied to the object. In addition, the second force 1030 may be an attractive force applied between the object and the other objects. Here, the attractive force applying to the other objects may be the force according to FIGS. 8 and 9 described above.

FIG. 10B is a diagram illustrating an embodiment in which the first force 1020 and the second force 1030 shown in FIG. 10A change during the simulation.

Referring to FIG. 10B, there may be two steps of modeling the position of objects.

Referring to FIG. 10B, a period 1040 of the first step may denote an inter-object attraction phase. In the period 1040 of the first step, a coefficient a(t) is not 0, but a gravitational acceleration g(t) is close to 0. Because there is no frictional force in the period 1040, the objects may freely move without friction while creating clusters with respect to the objects aligned according to the semantic similarity between the objects.

Referring to FIG. 10B, a period 1050 of the second step may denote a finalization phase. In the period 1050 of the second step, the gravitational acceleration g(t) may be applied prior to the force between the objects. Therefore, the objects may be moved due to the gravity, rather than the attractive force between the objects.

Figure 11:
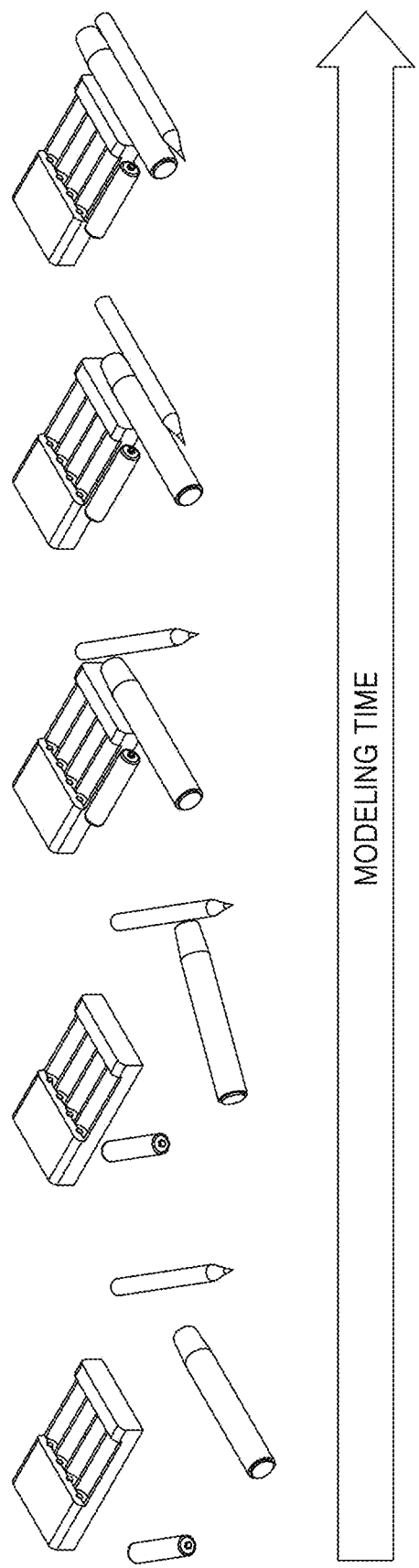
FIG. 11 is a diagram illustrating a change in a location of an object over time in modeling, according to an embodiment of the disclosure.

FIG. 11 is a diagram illustrating a change in a location of an object over time in modeling according to an embodiment of the disclosure.

Referring to FIG. 11, as a modeling time elapses, the objects positioned far from one another are moved to be close to one another. For example, the objects that are not organized are arranged in such a way that the objects are located adjacent to each other through modeling.

There may be various methods of arranging the objects through simulation. In a non-limiting example, the above methods may include, but are not limited to, a method of using virtual force fields (e.g., virtual bulldozer) of objects, a method of combining various forces, a method of using virtual wind, virtual elastic force, virtual attraction point, vibration simulated annealing, vibration in a shrinking sphere, and a method of forcibly rearranging objects without using a physical modeling.

In another embodiment of the disclosure, another method and unit for determining the attractive force between the objects and determining an object that may not be moved may be included.

All of the objects in the above-described embodiments do not have the usability characteristic, and the physical characteristics are only used for the simulation. An embodiment hereinafter shows an example of rearranging the objects by using the usability characteristic of the object.

Figure 12A:
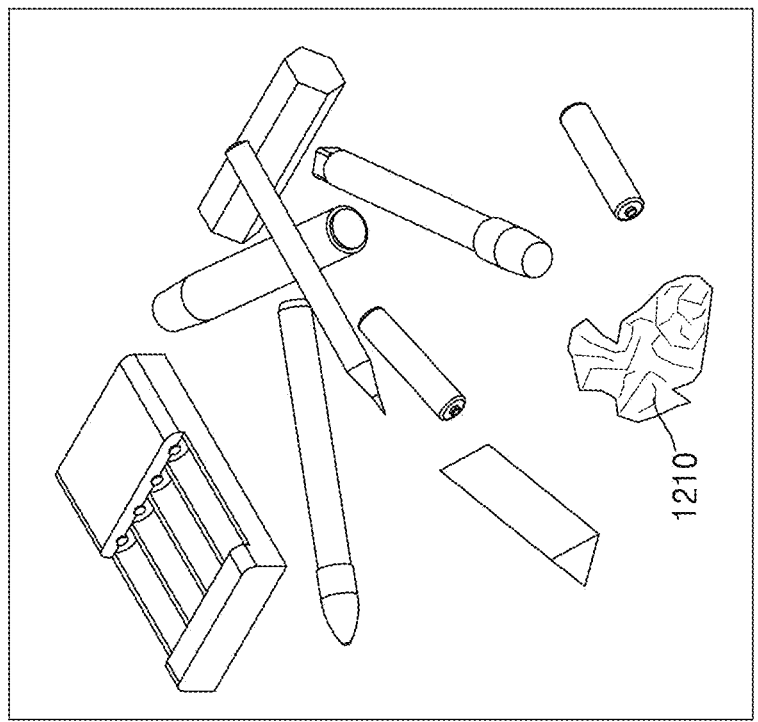
FIGS. 12A and 12B are diagrams illustrating a result of simulation in which objects are arranged by using usability characteristics of objects, according to various embodiments of the disclosure.
Figure 12B:
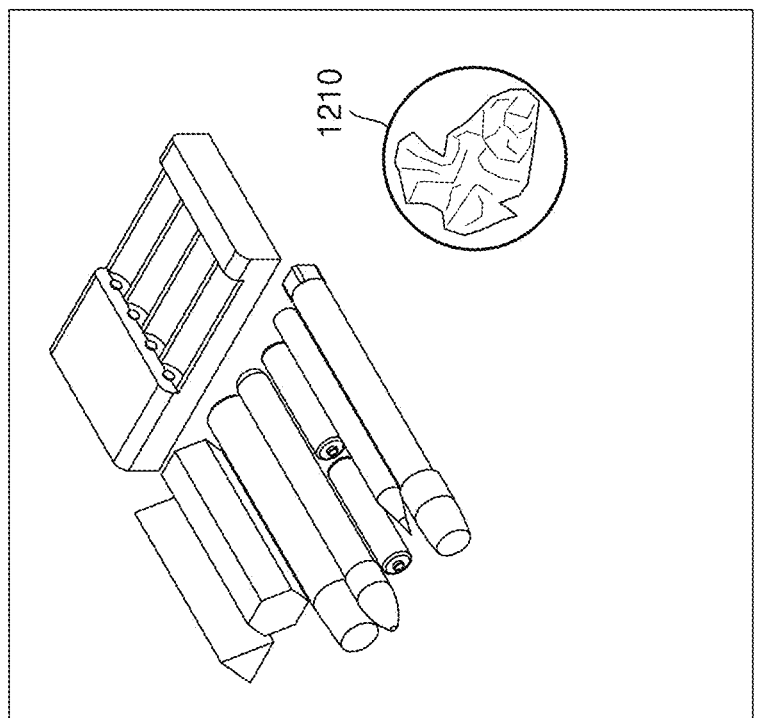

FIGS. 12A and 12B are diagrams illustrating a result of simulating arrangement of objects by using usability features of objects according to various embodiments of the disclosure.

According to an embodiment of the disclosure, in above operation S230, the device 100 may determine whether the first object is a target to be arranged (e.g., an object to be removed during organizing, garbage, or the like) based on the usability characteristic of the first object included in the plurality of objects. In addition, the device 100 may determine the position of the first object based on whether the first object is a target to be arranged.

Referring to FIG. 12A, it may be a diagram illustrating objects before being organized. For example, FIG. 12A may correspond to an image obtained or captured by the device 100 in operation S210. Here, when an object 1210 that is not to be arranged is included in objects to be organized, the device 100 needs to carry out the organization except for the garbage 1210.

According to an embodiment of the disclosure, the device 100 may determine whether each of the plurality of objects is a target 1210 (e.g., garbage) to be removed, based on the extracted usability characteristics. For example, in an embodiment of the disclosure, the additional usability characteristics of the objects may include classification as to whether the objects are non-garbage or garbage.

In above operation S250, when the first object is not the object to be arranged (that is, when the first object is the garbage 1210), the device 100 may generate a virtual arrangement image in which the objects to be arranged and the first object are distinguished from each other as shown in FIG. 12B.

For example, the device 100 may generate the image by isolating the object that is determined not to be the object to be arranged.

Referring to FIG. 12B, the object classified as the garbage 1210 may be represented as a visually changed expression (e.g., garbage may be marked) during rendering and displaying processes. For example, the garbage 1210 may be displayed to be distinguished from the other objects.

Figure 13:
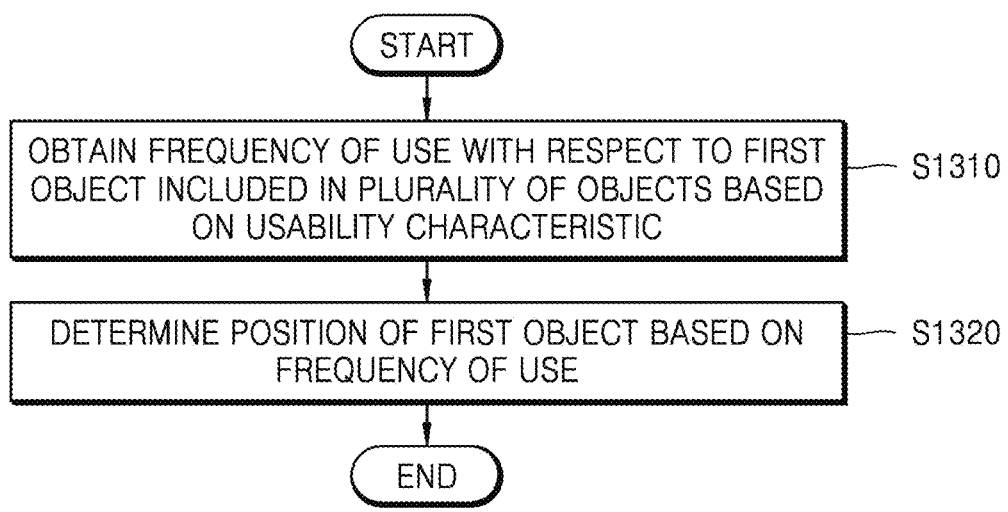
FIG. 13 is a flowchart illustrating a method of determining a position of an object based on a frequency of use of the object, according to an embodiment of the disclosure.

FIG. 13 is a flowchart illustrating a method of determining a position of an object based on a frequency of use of the object according to an embodiment of the disclosure.

Referring to FIG. 13, in operation S1310, the device 100 may obtain a frequency of use of the first object included in the plurality of objects, based on the usability characteristic.

In the disclosure, the usability characteristic may include a frequency of use of each of the plurality of objects. Here, the frequency of use of each object may be a relative concept.

According to an embodiment of the disclosure, the device 100 may determine the frequency of use for each of the plurality of objects based on an amount of position movement of each of the plurality of objects. This will be described in more detail below with reference to FIGS. 14, 15A, 15B, 16, and 17.

In operation S1320, the device 100 may determine the position of the first object based on the frequency of use.

According to an embodiment of the disclosure, when the device 100 determines the position of the first object based on the frequency of use, the device 100 may determine the position of the first object so that the first object is closer to a user preference area than a second object, in a case in which the frequency of use of the first object is greater than that of the second object.

According to an embodiment of the disclosure, the user preference area may be determined based on a distance between at least one region where the plurality of objects are arranged and the device 100.

This will be described in more detail below with reference to FIGS. 18, 19A to 19C, and 20.

Figure 14:
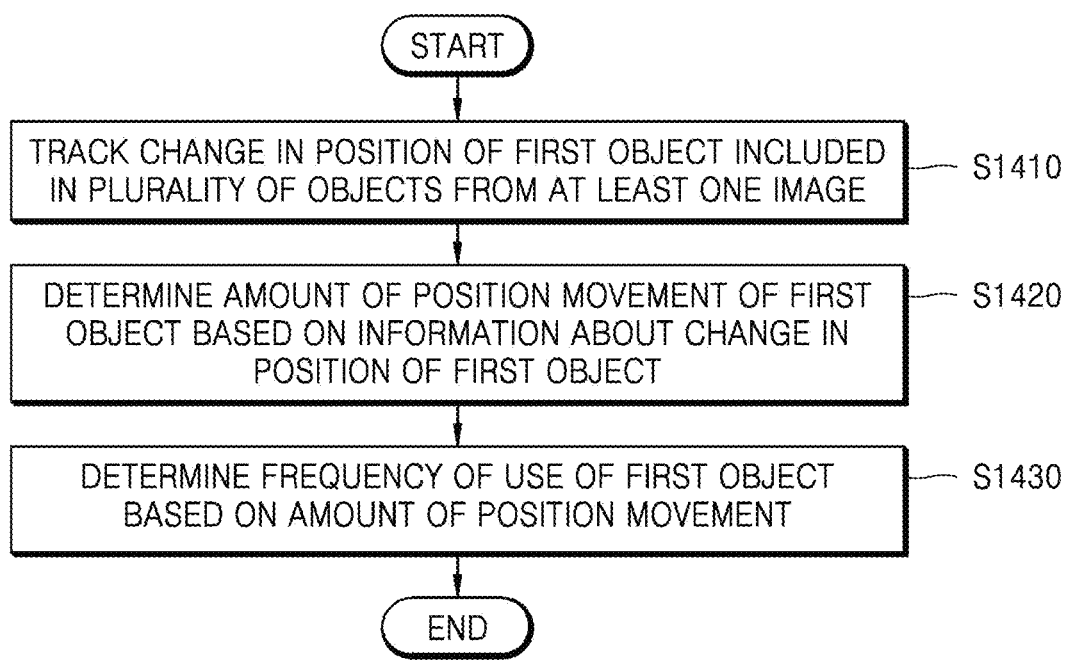
FIG. 14 is a flowchart illustrating a method of determining a frequency of use of an object, according to an embodiment of the disclosure.

FIG. 14 is a flowchart illustrating a method of determining a frequency of use of an object, according to an embodiment of the disclosure.

According to an embodiment of the disclosure, there may be data describing the frequency of using the objects (hereinafter, the frequency of use). The items may be rearranged according to the frequency of use. Here, there may be other various metrics using the frequency of use. Here, for example, the frequency of use may be determined at the forefront during the simulation.

According to an embodiment of the disclosure, the device 100 may identify positions of the objects, and may track whether the positions of the objects are changed.

Referring to FIG. 14, it may be a flowchart about the method of obtaining the frequency of use of the first object included in the plurality of objects based on the usability characteristic in operation S1310.

In operation S1410, the device 100 may track a change in the position of the first object included in the plurality of objects from at least one image. Here, the first object may denote an object included in the plurality of objects. For example, the first object may denote an object that is a target when tracking the position and movement of the object.

Here, the at least one image may denote an image captured so as to determine the frequency of use of the object and to track the change in the position of the object. According to an embodiment of the disclosure, the at least one image may denote images captured with a certain time interval. In addition, according to another embodiment of the disclosure, the at least one image may be an image captured when the object is moved.

In operation S1420, the device 100 may determine an amount of position movement of the first object, based on information about the position change of the first object.

In operation S1430, the device 100 may determine the frequency of use of the first object, based on the amount of position movement.

Here, the embodiments in which the position change is tracked by the device 100 will be described in more detail later with reference to FIGS. 15A, 15B, 16, and 17.

Figure 15:
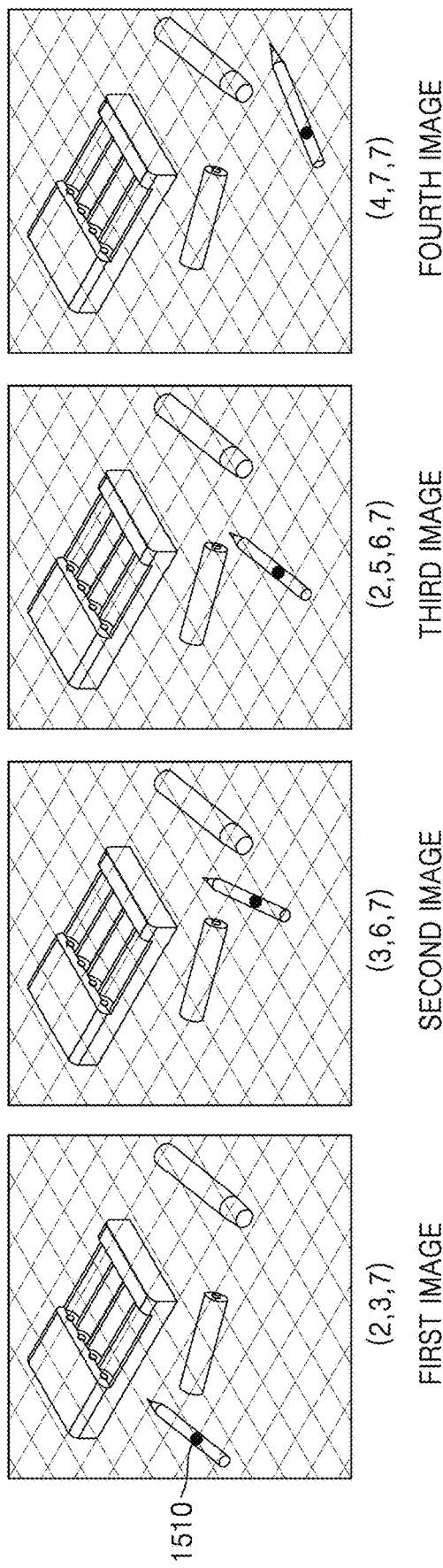
FIGS. 15A and 15B are diagrams illustrating a method of determining a frequency of use of an object, according to various embodiments of the disclosure.

FIGS. 15A and 15B are diagrams illustrating a method of determining a frequency of use of an object, according to various embodiments of the disclosure.

Referring to FIGS. 15A and 15B, they illustrate a method of determining the frequency of use of the object, in order to perform the simulation in which the objects are organized by using the usability characteristics of the objects.

In an embodiment of the disclosure, in order to determine the frequency of use of the object, all observations of the object may be processed to calculate a root mean square (RMS) value, as expressed by Equation below.

$$\text{RMS} = \frac{1}{N}\sqrt{\sum_{day=1}^{N}\left[(x_{day}-\bar{x})^2 + (y_{day}-\bar{y})^2 + (z_{day}-\bar{z})^2\right]} \quad \text{Equation 3}$$

Here, $\bar{x}$, $\bar{y}$, and $\bar{z}$ are average values of all coordinate values with respect to the object obtained during observation. In the embodiment of the disclosure, as an RMS value increases, it may denote that the item is more frequently used by the user.

Referring to FIG. 15A, a position of a pen 1510 is continuously tracked to obtain the RMS value. Here, according to an example, a first image may denote an image captured on the first day, a second image may denote an image captured on the second day, a third image may denote an image captured on the third day, and a fourth image may denote an image captured on the fourth day.

Referring to FIG. 15A, the device 100 obtains the position of the pen 1510 as (2, 3, 7) in the first image. Here, the device 100 may obtain the position of the object as an (x, y, z) coordinate, and x, y, and z coordinates of the object may be bound to a global coordinate system.

Referring to FIG. 15A, the device 100 obtains the position of the pen 1510 as (3, 6, 7) in the second image. In addition, the device 100 obtains the position of the pen 1510 as (2, 5, 6, 7) in the third image, and obtains the position of the pen 1510 as (4, 7, 7) in the fourth image.

In more detail, values of $\bar{x}$, $\bar{y}$, and $\bar{z}$ with respect to the position of the pen 1510 may be calculated respectively as $\bar{x}=(2+3+2.5+4)/4=2.875$, $\bar{y}=(3+6+6+7)/4=5.5$, $\bar{z}=7$. Therefore, when the RMS value of the pen 1510 in the first to fourth images is calculated according to Equation 3 below, the RMS value of the pen 1510 may be calculated as follows.

$$\text{RMS}=0.25*((2-2.875)^2+(3-5.5)^2+0^2+(2.875-3)^2+ \\ (5.5-6)^2+0^2+(2.875-4)^2+(5.5-6)^2+0^2+(2.875-4) \\ ^2+(5.5-7)^2+0^2)^{1/2}=0.25*(11.1875)^{1/2}=0.836 \quad \text{Equation 4}$$

Therefore, the RMS value of the pen 1510 may be 0.836.

Referring to FIG. 15B, the RMS value of each of the plurality of objects shown in FIG. 15A may be identified. As compared with the values of the other objects, the RMS value of the pen 1510 is greater. Accordingly, it may be identified that the user changes the position of the pen 1510 most frequently, and the user frequently uses the pen 1510 as compared with the other objects.

Figure 16:
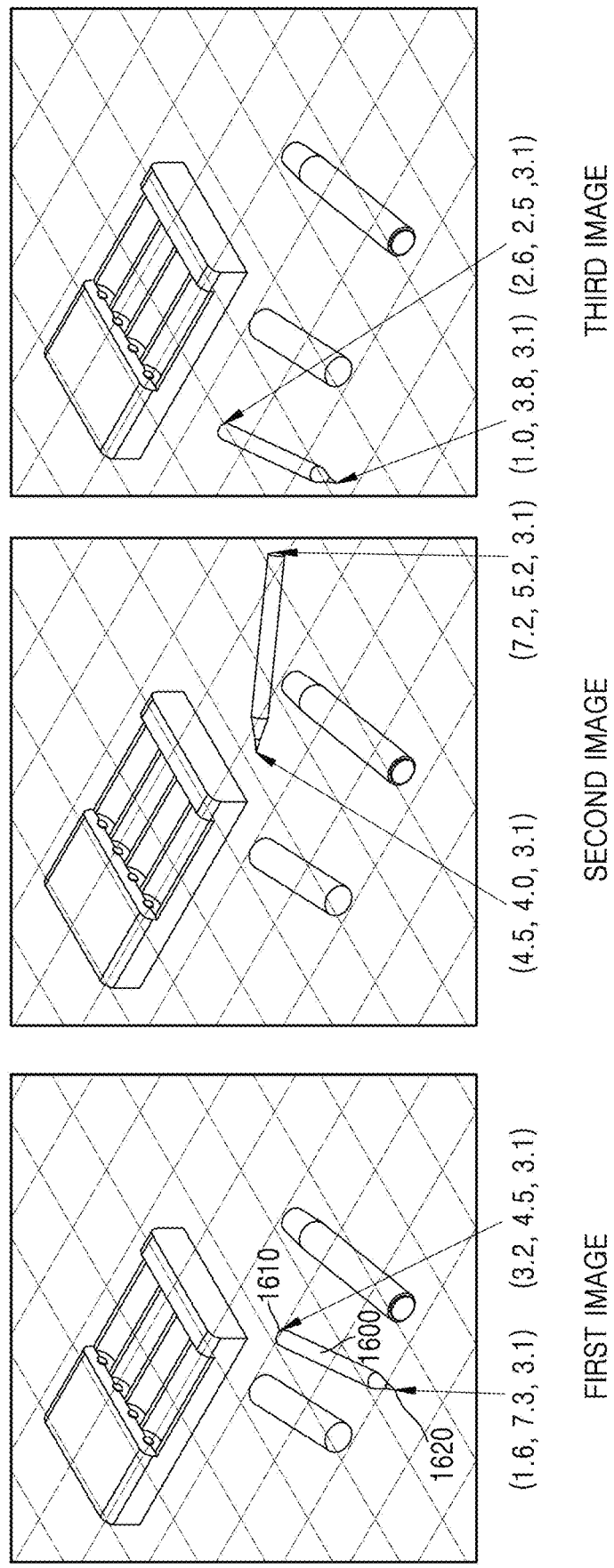
FIG. 16 is a diagram illustrating a method of determining a frequency of use of an object, according to an embodiment of the disclosure.

FIG. 16 is a diagram illustrating a method of determining a frequency of use of an object according to an embodiment of the disclosure.

In another embodiment of the disclosure, each object may be recognized by using two anchor points. Referring to FIG. 16, according to an example, positions of a tip 1620 and an end 1610 of a pen 1600 are determined.

Referring to FIG. 16, in the first image, the positions of the end 1610 and the tip 1620 of the pen 1600 may be respectively (3.2, 4.5, 3.1) and (1.6, 7.3, 3.1). In the second image, the positions of the end 1610 and the tip 1620 of the pen 1600 are respectively (7.2, 5.2, 3.1) and (4.5, 4.0, 3.1). In the third image, the positions of the end 1610 and the tip 1620 of the pen 1600 are respectively (2.6, 2.6, 3.1) and (1.0, 3.8, 3.1).

As described above, the device 100 may track the position of the object by using two anchor points with respect to an object. In addition, the device 100 may obtain the RMS value by using two anchor points with respect to the object.

RMS may be calculated in the same way as described above with reference to FIGS. 15A and 15B by using Equation below.

$$\text{RMS} = \frac{1}{2N}\sqrt{\sum_{i=1}^{2}\sum_{day=1}^{N}\left[(x_{i,day}-\bar{x}_i)^2 + (y_{i,day}-\bar{y}_i)^2 + (z_{i,day}-\bar{z}_i)^2\right]} \quad \text{Equation 5}$$

Likewise, the object having the greater RMS value as compared with the other objects may be determined has large frequency of use.

Figure 17:
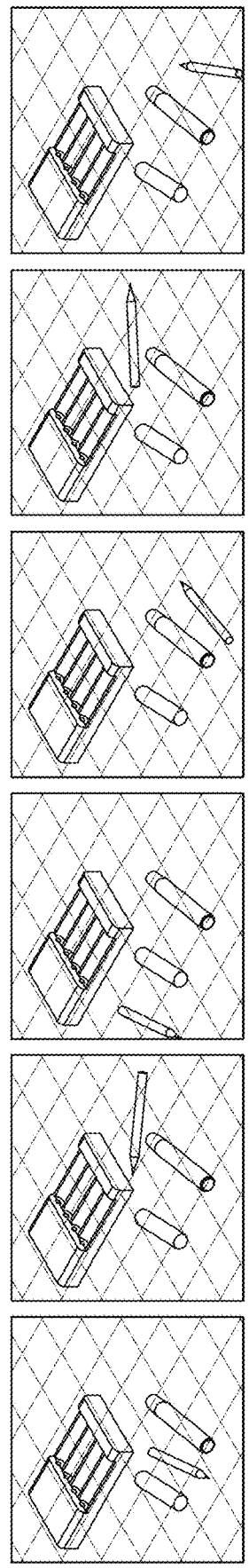
FIG. 17 is a diagram illustrating a method of determining a frequency of use of an object, according to an embodiment of the disclosure.

FIG. 17 is a diagram illustrating a method of determining a frequency of use of an object according to an embodiment of the disclosure.

Referring to FIG. 17, it illustrates an example in which positions of the objects are changed according to the frequencies of use of the objects. In addition to the examples described above with reference to FIGS. 15A, 15B, and 16, there may be various methods of determining the frequency of use of the object.

For example, in another embodiment of the disclosure, three anchor points per one object may be used to track the position change of 6 degrees of freedom (DoF).

When the object is invisible from a field-of-view (FoV) of the camera or is not tracked by a similar unit for tracking the object, the coordinate RMS value or other arbitrary frequency of use measurement metrics may be calculated by using various rules or methods. In an embodiment of the disclosure, when the object is invisible from the FoV of the camera, a constant positive value may be heuristically added to the RMS value.

In another embodiment of the disclosure, an end-to-end deep learning method may be applied to calculate the frequency of use of the object. When a data set and a series of images synthesized based on a CleVR methodology containing the positions of the objects sequentially are given, usability values (based on coordinate values of RMS values) may be used. A deep neural network based on a 3D convolutional network may be used to learn usability values of the objects in the end-to-end manner.

However, the disclosure is not limited to the above methods, and the frequency of use of the object may be obtained in various ways.

Figure 18:
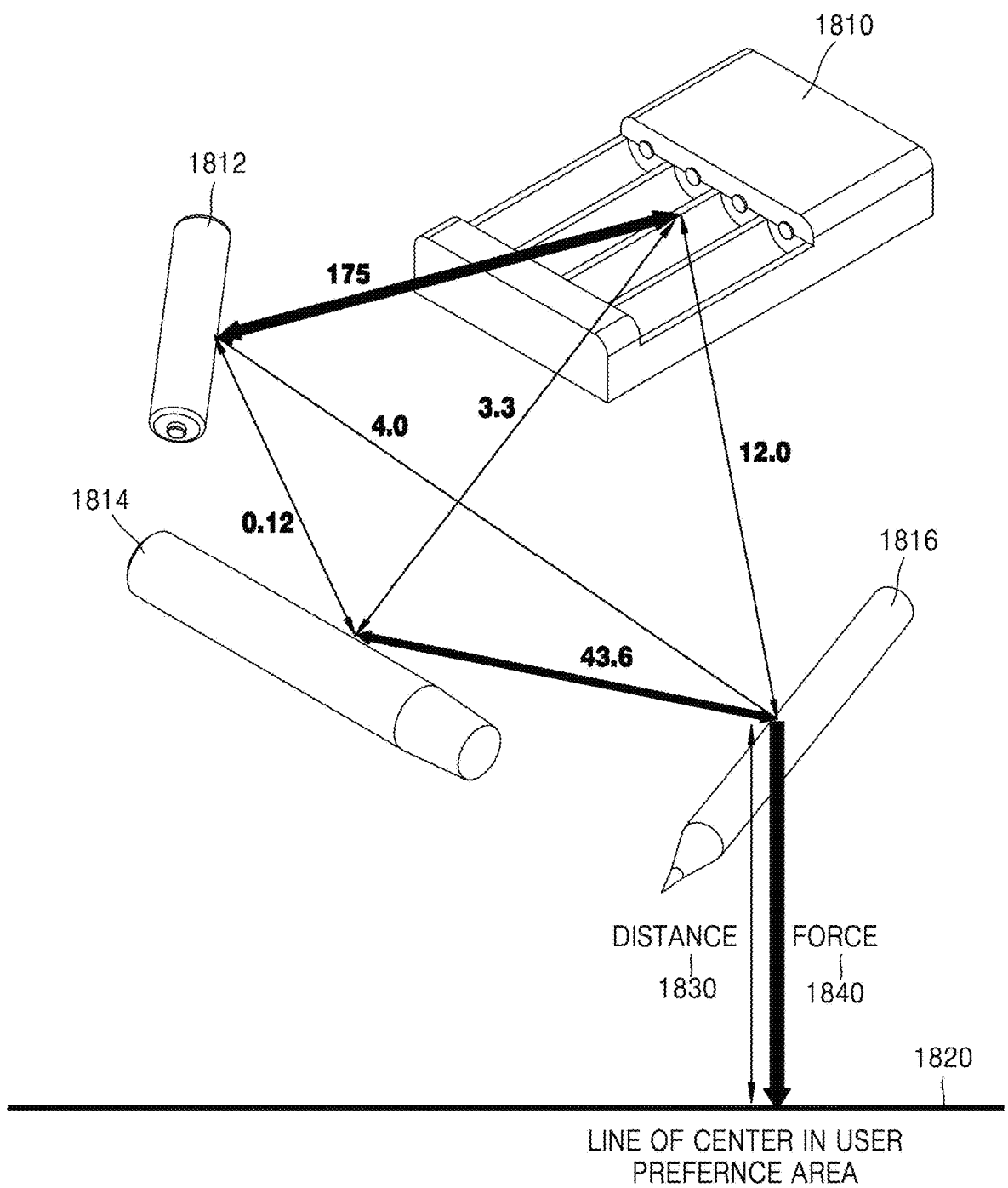
FIG. 18 is a diagram illustrating a method of determining positions of objects based on characteristics of the objects, according to an embodiment of the disclosure.

FIG. 18 is a diagram illustrating a method of determining positions of objects taking into account features of the objects according to an embodiment of the disclosure.

First, in order to determine the position of the objects, the above-mentioned frequency of use may be considered as the characteristic of the objects. In addition, the attractive force applied between the objects in proportional to the frequency of use may be also considered. In addition, referring to FIG. 18, an additional force 1840 may be used with respect to the object during the simulation.

For example, the additional force 1840 may include a spring force with respect to a virtual line passing through a user preference area. Here, the preference area denotes an area that the user prefers to access, and in more detail, may denote a most convenient area for the user to use or pickup an object.

Referring to FIG. 18, values regarding attractive forces applied among a charger 1810, a battery 1812, a marker 1814, and a pen 1816 are shown.

Referring to FIG. 18, an example in which the first object, of which the position is to be determined, is the pen 1816 will be described. In FIG. 18, a line of center of user preference area 1820 may denote a virtual line located on the user preference area.

Here, a distance 1830 may denote a distance from the pen 1816 to the line of center of the user preference area 1820.

A force 1840 applied to the pen 1816 may calculated as k*distance 1830. Here, k may denote a coefficient applied so that the object may be located adjacent to the preference area, and may denote an elastic coefficient. In addition, according to an embodiment of the disclosure, k may denote a value set in proportional to the frequency of use of the object.

Figure 19A:
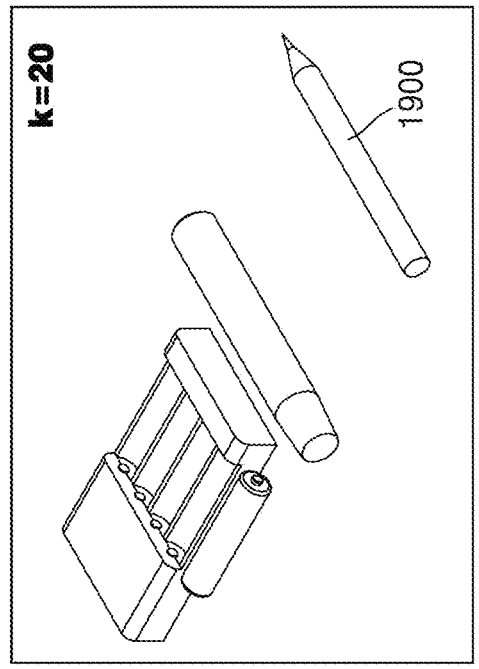
FIGS. 19A, 19B, and 19C are diagrams illustrating a method of arranging objects based on frequency of use, according to various embodiments of the disclosure.
Figure 19B:
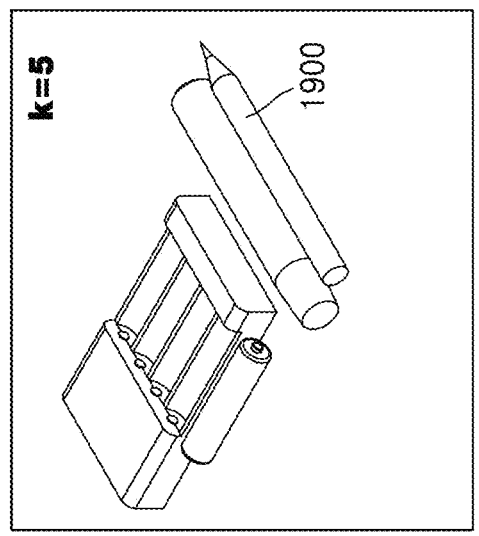
Figure 19C:
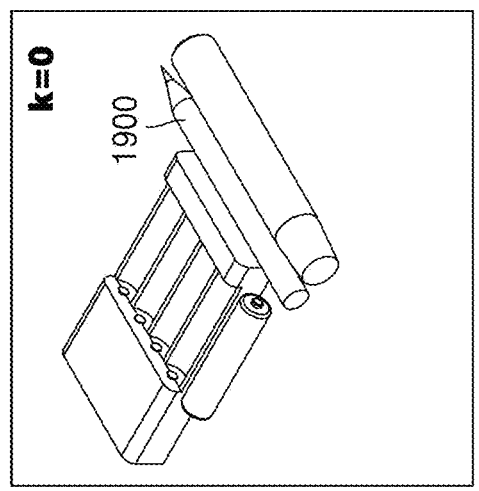

FIGS. 19A, 19B, and 19C are diagrams illustrating a method of arranging objects based on usage frequency according to various embodiments of the disclosure.

Referring to FIG. 19A, it may show a virtual arrangement image, in which objects are arranged taking into account the frequency of use of a pen 1900 when the pen 1900 is not used. Here, k may have a value of 0.

Referring to FIG. 19B, it may correspond to a virtual arrangement image in which objects are arranged when the pen 1900 is used with an intermediate frequency of use. Here, k may have a value of 5.

Referring to FIG. 19C, it may correspond to a virtual arrangement image in which the objects are arranged when the pen 1900 is used with high frequency of use. Here, k may have a value of 20. Here, the frequency of use may be a relative concept among the objects.

According to an embodiment of the disclosure, the pen 1900 may be located differently depending on the additional force during the simulation. When the object is more frequently used by the user, a value of the elastic coefficient (k) which attracts the object toward the virtual line determining the center of the easy access area (user preference area) may increase. As the object is close to the above line, the force may be reduced. While the simulation is performed, balance among the forces may be set when the simulation ends.

In the second step of the simulation, in which the gravity increases and the elastic force decreases (see FIGS. 10A and 10B), the force affecting the usability may be decreased. When the simulation ends, the objects may be located in the user preference area.

According to an embodiment of the disclosure, the objects located in the user preference area may be determined based on the frequency of use.

Figure 20:
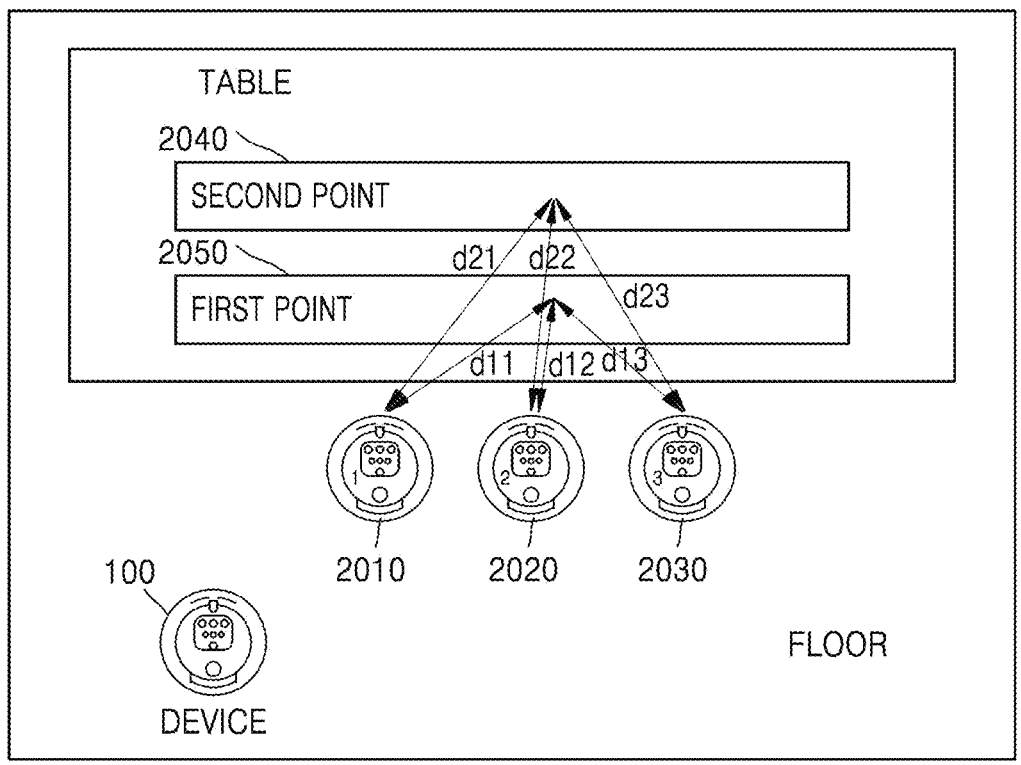
FIG. 20 is a diagram illustrating a method of determining a user preference area, according to an embodiment of the disclosure.

FIG. 20 is a diagram illustrating a method of determining a user preference area according to an embodiment of the disclosure.

Referring to FIG. 20, an easy or easy-to-access area (user preference area) may be determined by a non-limiting method.

According to an embodiment of the disclosure, the user preference area may be an area located at the shortest distance to the camera installed on the device 100 during all the movements of the device 100 in a certain place (e.g., an apartment), an area closest to the user in a table or a shelf, or the like, or an area explicitly designated by the user.

According to an embodiment of the disclosure, the user preference area may be determined by comparing a first distance between the position of the device 100 and a first point 2050 with a second distance between the position of the device 100 and a second point 2040.

In an embodiment of the disclosure, an area designated as a target to be organized by the user may be covered by a plurality of points. In a non-limiting example, the area designated as a target to be organized by the user may be classified by three points. A first point may be set as an access area preferred by the user (e.g., an area in which the user may easily use the object), a second point may be set an access area of an intermediate difficulty, and the other area may be set as an area for the user to be difficult to access (e.g., located far away). However, it is not limited to the three points as described above.

Referring to FIG. 20, it will be described under the assumption in which the first point 2050 and the second point 2040 are in the area set by the user as a target to be organized. The first point 2050 is a closest area that the user may use in the area of the table, and the second point 2040 may denote a middle area in the table.

Here, the device 100 may include a camera. Based on the geometrical rules and a first position 2010, a second position 2020, and a third position 2030 of the device 100 (e.g., robot), the first distance between the position of the device 100 and the first point 2050 and the second distance between the position of the device 100 and the second point 2040 may be determined.

Here, a sum of distances from the first position 2010, the second position 2020, and the third position 2030 of the device 100 to the second point 2040 is greater than a sum of the distances from the first position 2010, the second position 2020, and the third position 2030 of the device 100 to the first point 2050. For example, a condition d21+d22+d23>d11+d12+d13 is satisfied. For example, d21+d22+d23 that is the sum of the distances from the positions of the device 100 to the second point 2040 is greater than d11+d12+d13 that is the sum of the distances between the positions of the device 100 and the first point 2050. Therefore, it may be identified that the second point is farther than the first point.

Here, d21 may denote the distance between the second point 2040 and the first position 2010, d22 may denote the distance between the second point 2040 and the second position 2020, and d23 may denote the distance between the second point 2040 and the third position 2030. In addition, d11 may denote the distance between the first point 2050 and the first position 2010, d12 may denote the distance between the first point 2050 and the second position 2020, and d13 may denote the distance between the first point 2050 and the third position 2030.

Through the above method, it may be identified that the first point 2050 and the peripheral environment of the first point 2050 are easy to access for the user. As such, the device 100 may determine the area of the first point 2050 as the user preference area.

Figure 21:
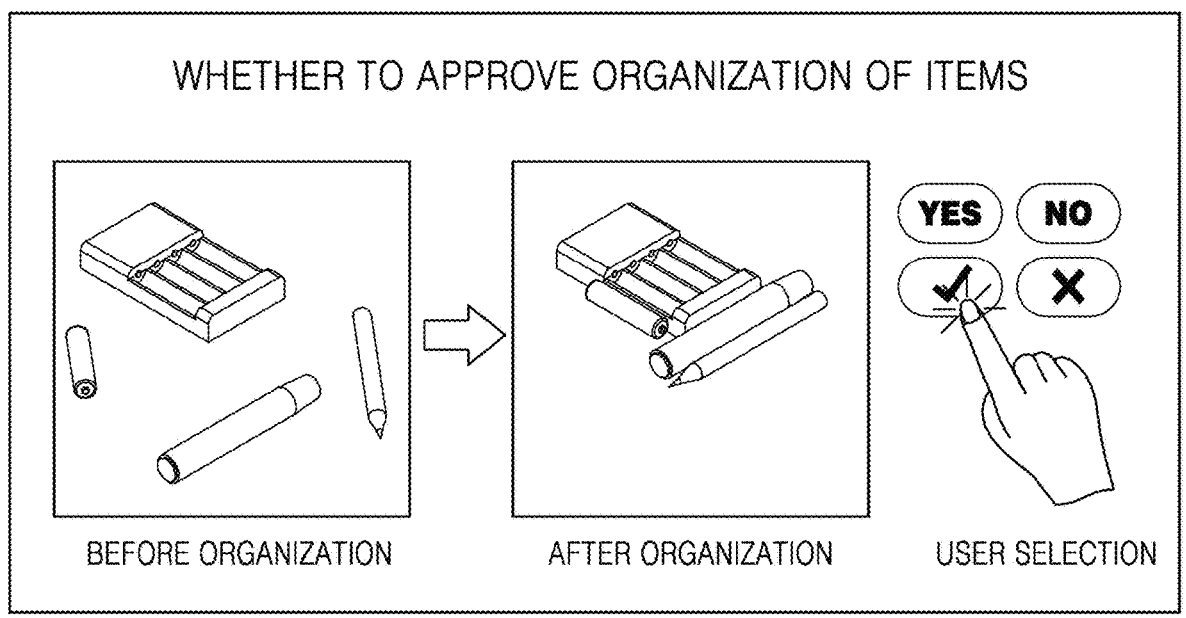
FIGS. 21 and 22 are diagrams illustrating user interfaces (UIs) for displaying a virtual arrangement image, by a device, according to various embodiments of the disclosure.
Figure 22:
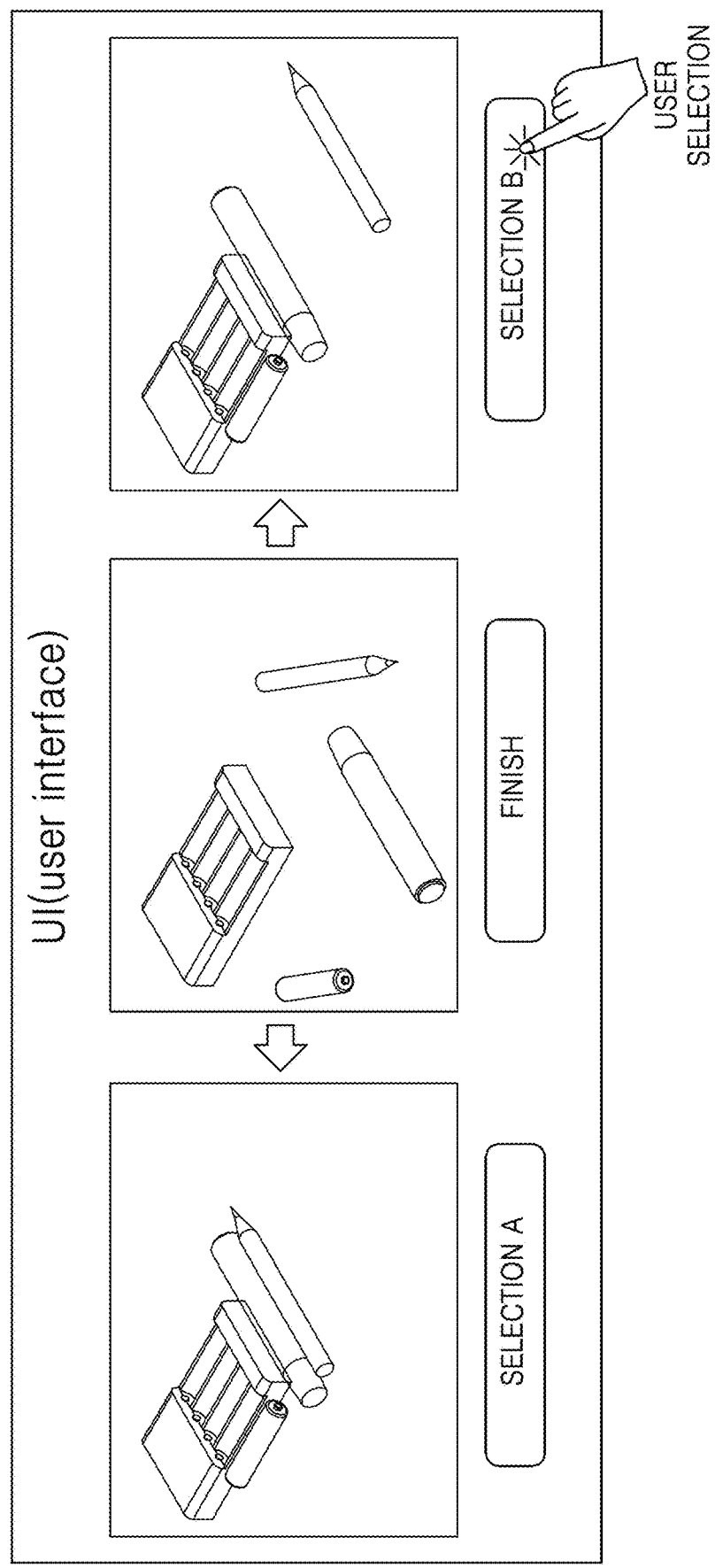

FIGS. 21 and 22 are diagrams illustrating UIs for displaying a virtual arrangement image, by a device, according to various embodiments of the disclosure.

Referring to FIGS. 21 and 22, they describe the embodiment regarding operation S250 described above with reference to FIG. 2. According to an embodiment of the disclosure, a rendering result may be generated as UI. Here, the device 100 may generate and display a few options that the user may select as a UI.

According to an embodiment of the disclosure, the options may include a selection as to whether to agree the arrangement of the objects suggested by the device 100. When describing with reference to FIG. 21, a UI for selecting whether to approve the arrangement of the items suggested by the device 100 may be generated. For example, as shown in FIG. 21, an image showing the objects before organizing (current) and an image showing the objects after being organized may be displayed. When the user selects yes to the organizing, the device 100 may arrange the plurality of objects according to the selected image based on the received input. In addition, in another example, when the user selects no to the organizing, the device 100 may not carry out the organization of the objects based on the received input.

According to an embodiment of the disclosure, a few selections may be suggested to the user. Referring to FIG. 22, several options may be displayed so that the user may select. For example, several options may correspond to the virtual arrangement images generated based on different arrangement algorithms. Referring to FIG. 22, selection A may be a virtual arrangement image generated based on the first arrangement algorithm, and selection B may be a virtual arrangement image generated based on the second arrangement algorithm.

According to an embodiment of the disclosure, when the user refuses the suggested rearrangement simulation of the objects, another rearrangement of the objects may be generated. For example, when the device 100 receives a user input of No as shown in FIG. 21, the device 100 may generate the virtual arrangement image of the objects based on another arrangement algorithm.

Figure 23:
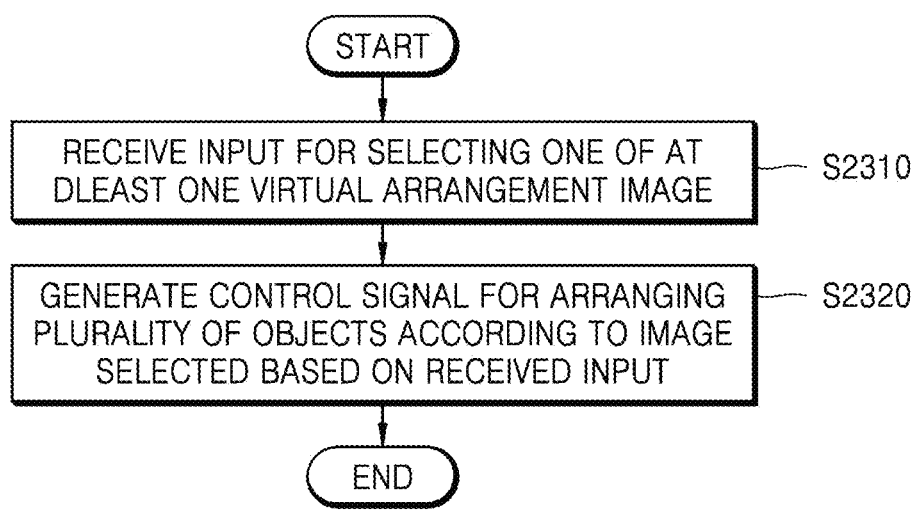
FIG. 23 is a flowchart illustrating a method of generating, by a device, a control signal for arranging a plurality of objects based on a virtual arrangement image, according to an embodiment of the disclosure.

FIG. 23 is a flowchart illustrating a method of generating, by a device, a control signal for arranging a plurality of objects based on a virtual arrangement image, according to an embodiment of the disclosure.

As described above with reference to FIGS. 21 and 22, the device 100 may generate a UI for selecting at least one virtual arrangement image when displaying the virtual arrangement images. Here, the at least one virtual arrangement image may include an image in which the plurality of objects are virtually arranged based on different arrangement algorithms.

Referring to FIG. 23, in operation S2310, the device 100 may receive an input of selecting one of the at least one virtual arrangement image.

In operation S2320, the device 100 may generate a control signal for arranging the plurality of objects according to the selected virtual arrangement image.

According to an embodiment of the disclosure, the device 100 may generate a control signal for arranging the plurality of objects according to the selected image based on the received input. Here, the device 100 may arrange the plurality of objects based on the control signal. For example, when the device 100 is a robot that may carry out a function of organizing the objects based on the control signal, the device 100 may arrange the plurality of objects based on the generated control signal.

In another example, the device 100 may transmit the control signal to an external device. For example, when the external device is a robot that may carry out a function of organizing the objects based on the control signal, the device 100 may transmit the control signal to the external device and the external device (e.g., robot) may arrange the plurality of objects based on the generated control signal.

Figure 24:
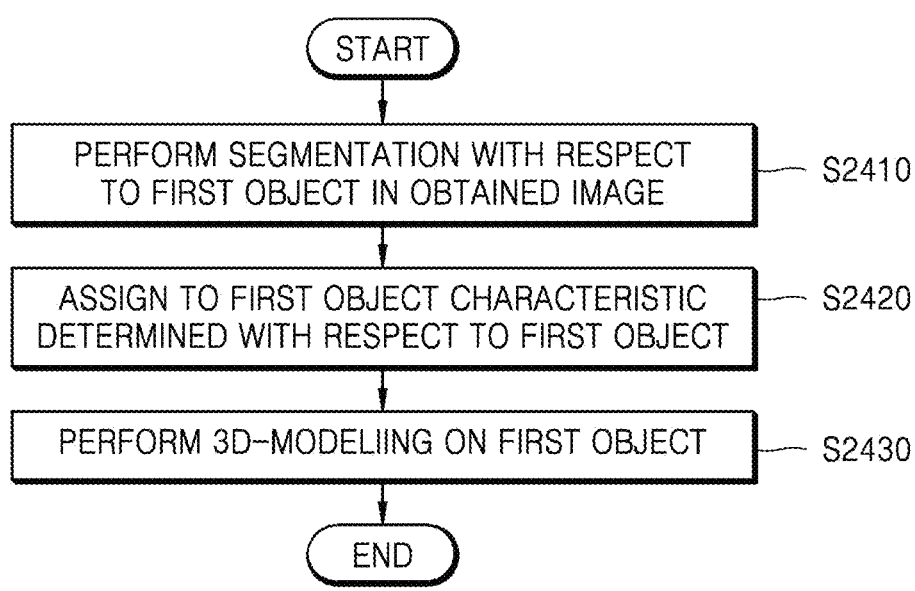
FIG. 24 is a flowchart illustrating a method of generating virtual object, according to an embodiment of the disclosure.

FIG. 24 is a flowchart illustrating a method of generating virtual object according to an embodiment of the disclosure.

Referring to FIG. 24, in operation S2410, the device 100 may perform segmentation of the first object from the obtained image.

Here, according to an embodiment of the disclosure, the segmentation of the object may be performed by using semantic segmentation. In more detail, the device 100 may perform a semantic segmentation with respect to the objects in at least one image.

Figure 25A:
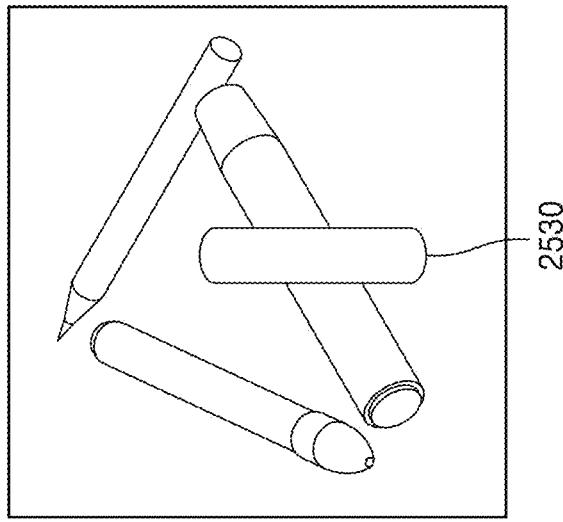
FIGS. 25A, 25B, and 25C are diagrams illustrating semantic segmentation according to various embodiments of the disclosure.
Figure 25B:
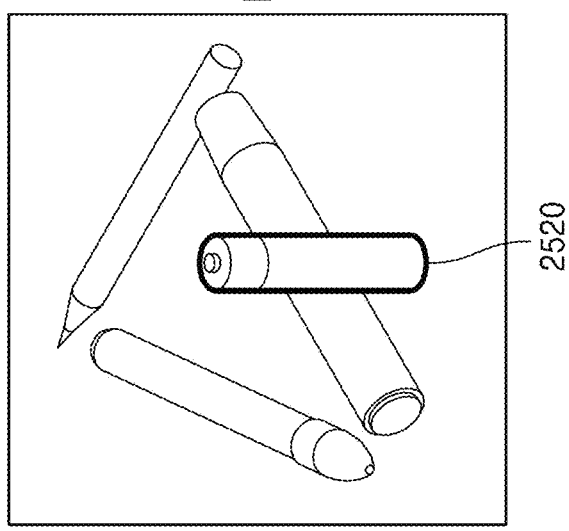
Figure 25C:
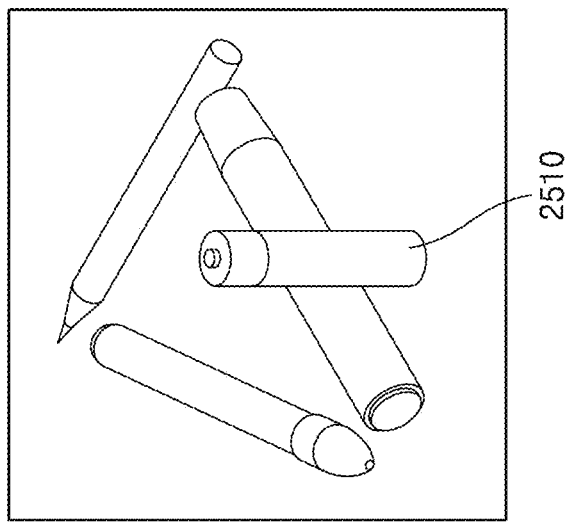

FIGS. 25A, 25B, and 25C are diagrams illustrating semantic segmentation according to various embodiments of the disclosure.

Referring to FIGS. 25A, 25B, and 25C, the semantic segmentation may denote that the first object included in the plurality of objects is deleted or isolated from the obtained image.

Referring to FIG. 25A, an initial image 2510 may be obtained.

Referring to FIG. 25B, the segmentation may be carried out with respect to the first object, e.g., a battery 2520, from the initial image. The segmented object 2520 may be stored.

Referring to FIG. 25C, a segmented object 2530 may be cut from the image.

According to an embodiment of the disclosure, the device 100 may delete the segmented objects one by one from the image, and may fill a gap through inpainting. For example, a mask for inpainting may be performed with respect to the image. Here, in the disclosure, the inpainting may denote an algorithm for masking a specific region of an image and reconstructing a gap.

Figure 26:
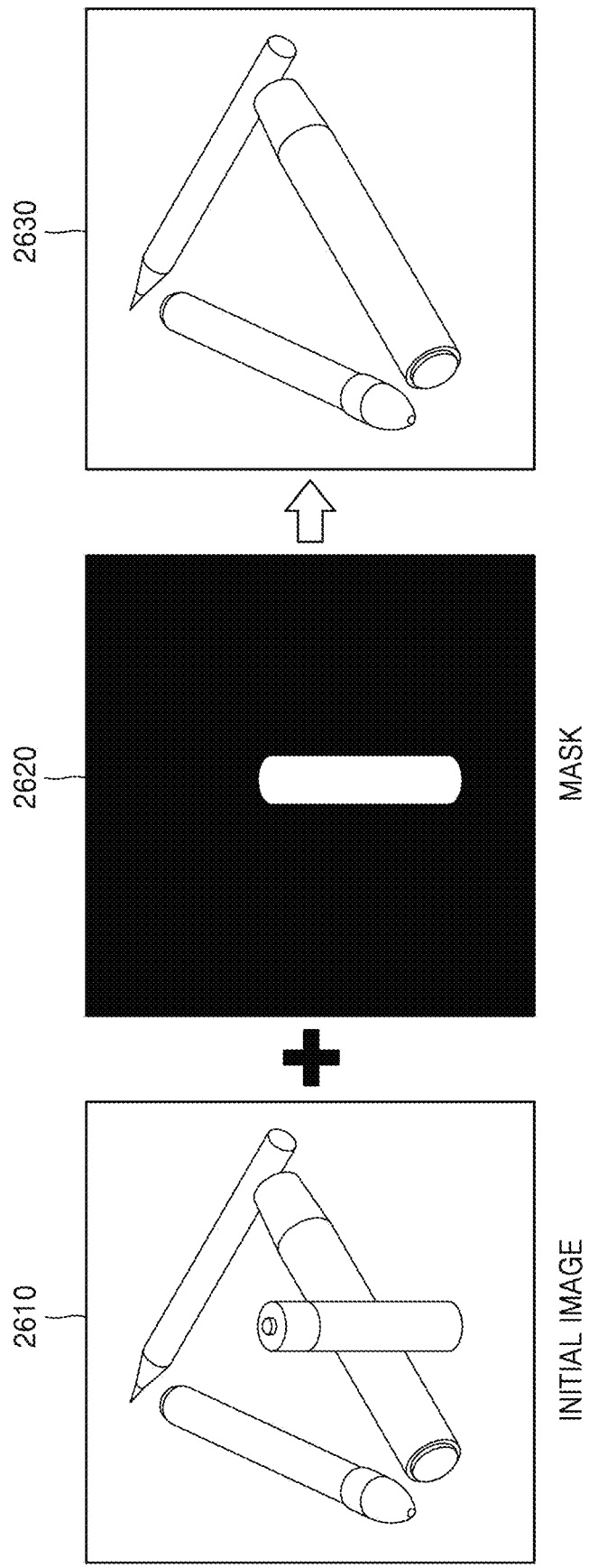
FIG. 26 is a diagram for illustrating inpainting according to an embodiment of the disclosure.

FIG. 26 is a diagram for illustrating inpainting according to an embodiment of the disclosure.

Referring to FIG. 26, an initial image 2610 and a mask 2620 may be input into the inpainting algorithm in order to carry out the inpainting. Through the above processes, an image 2630 from which the object is removed may be obtained.

Figure 27A:
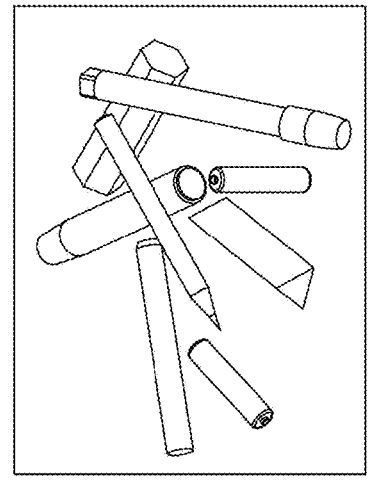
FIGS. 27A and 27B are diagrams for describing a method of generating a plurality of virtual objects corresponding to a plurality of objects, according to various embodiments of the disclosure.
Figure 27B:
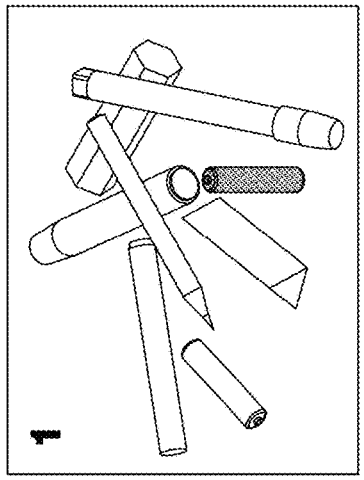

FIGS. 27A and 27B are diagrams for describing a method of generating a plurality of virtual objects corresponding to a plurality of objects, according to various embodiments of the disclosure.

Referring to FIGS. 27A and 27B, the above processes are sequentially carried out with respect to each of the plurality of objects. For example, the segmentation and the inpainting may be carried out sequentially to each of the plurality of objects included in the initial image as shown in FIG. 27A. The device 100 may repeatedly perform the segmentation and the inpainting until no object remains.

In operation S2420, the device 100 may assign to the first object the determined characteristic with respect to the first object.

Here, the characteristic determined with respect to the first object may denote at least one of the visual characteristic, the physical characteristic, or the usability characteristic with respect to the first object as described above.

In operation S2430, the device 100 may perform 3D-modelling on the first object.

In more detail, the device 100 may perform a 3D reconstruction of the objects on the area and a 3D object that may not be moved, such as a plane, or the like.

Figure 28:
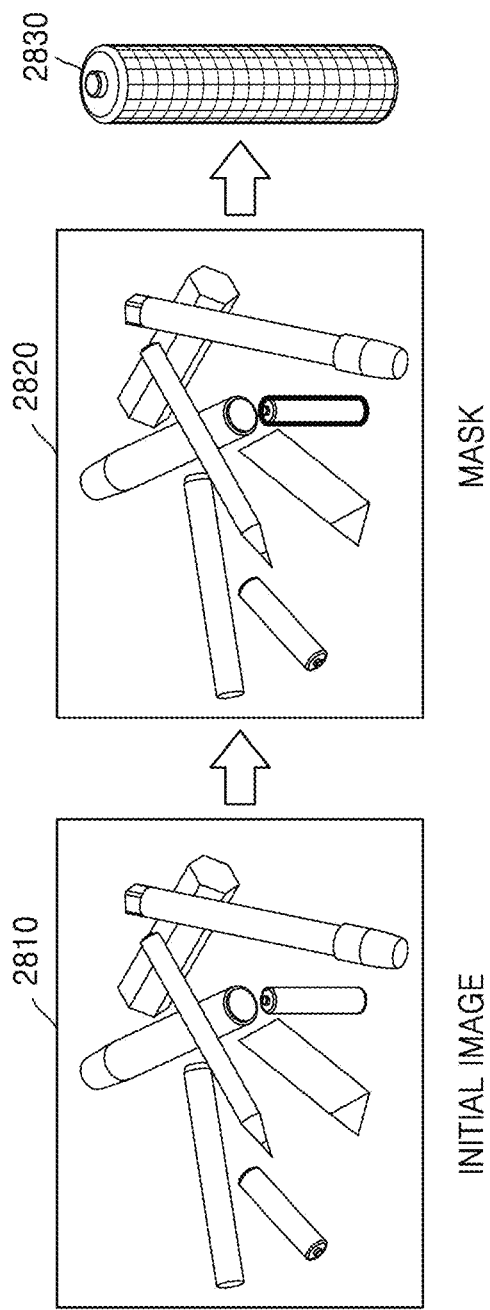
FIG. 28 is a diagram illustrating a method of generating a virtual object according to an embodiment of the disclosure.

FIG. 28 is a diagram illustrating a method of generating a virtual object according to an embodiment of the disclosure.

Referring to FIG. 28, the segmentation and masking may be performed with respect to an initial image 2810. In addition, the object 2820 to which the segmentation is applied may be stored for a 3D shaping. In addition, the 3D shaping is carried out with respect to the stored object, and thus, a virtual object 2830 may be generated.

FIGS. 29A, 29B, and 29C are diagrams illustrating a method of performing, by a device, rearrangement of objects located in a certain region, according to various embodiments of the disclosure.

Referring to FIG. 29A, the device 100 may receive a command from the user so that the device 100 or the external device (e.g., robot) performs the rearrangement of the objects located in a certain area (area in which objects to be arranged are located). The device 100 may capture at least one image (2D or RGBD) of the certain area. As described above with reference to FIG. 1, the device 100 may be a robot in a non-limiting example, or may be a device configured to communicate with an external device (e.g., robot).

Referring to FIGS. 24, 25A to 25C, 26, 27A, and 27B described above, the device 100 may perform a semantic segmentation with respect to the objects in at least one image. The device 100 removes divided objects from the image one by one, and fills gaps through inpainting. The device 100 may repeatedly perform the segmentation and the inpainting until there is no object remaining as a segment.

The device 100 carries out the simulation, and the device 100 may perform a 3D reconstruction of the objects on the area and a 3D object that may not be moved, such as a plane, or the like.

Referring to FIG. 29B, the device 100 may calculate rearrangement of at least two possible 3D objects in an area that is reconstructed as 3D.

Here, an embodiment when the arrangement algorithm is a method of arranging the objects according to the semantic similarity will be described below in detail.

First, the device 100 may recognize the objects. Here, the text labels may be applied. The device 100 may calculate the pairwise semantic distance between the pair of objects. Here, GloVe-300 embedding may be used as an example.

The device 100 may estimate the physical characteristics of the objects (e.g., weights of the objects) based on a database about the weights of the objects based on the kinds of the objects. (Virtual) objects having corresponding weights may be input into a 3D physical simulator. Here, the virtual 3D objects may be input into the 3D physical simulator along with the database about the physical characteristics of the objects (e.g., weights, frictional forces, or the like, of the objects).

According to an embodiment of the disclosure, the simulation may be performed so that the physical force (e.g., pairwise force, attractive force) that is in proportional to the semantic similarity of the objects may be applied between the objects in the 3D physical simulator. While the simulation performed, the vibration that decreases over time may be applied to the surface to which a decreasing pairwise force is applied.

In the above method, according to the simulated annealing, the objects may be semantically grouped and located at optimal positions.

Accordingly, the virtual objects may be virtually arranged in the virtual space according to at least one arrangement algorithm as shown in FIG. 29B.

Referring to FIG. 29C, a UI may be generated and displayed to the user. Here, the rendered view may be stored to be displayed to the user. Here, the device 100 may render at least two possible rearrangements as bitmap images of video files. According to an embodiment of the disclosure, at least two possible rearrangements may be suggested to the user.

According to an embodiment of the disclosure, a selection between at least two possible rearrangements may be input from the user. In addition, according to an example, the device 100 may send a command to the robot in order to carry out the selected rearrangement of the belongings.

Figure 30:
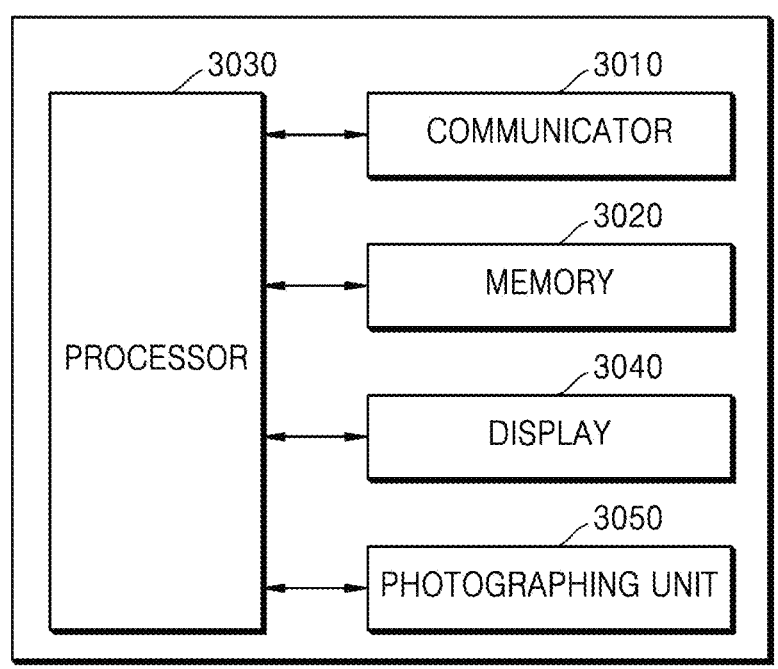
FIG. 30 is a block diagram of a device according to an embodiment of the disclosure.

FIG. 30 is a block diagram of a device according to an embodiment of the disclosure.

Referring to FIG. 30, the device 100 of the disclosure may include a processor 3030, a communicator 3010, a memory 3020, a display 3040, and a photographing unit 3050. However, elements of the device 100 are not limited to the above example. For example, the device 100 may include the elements that are more than or less than the above-described elements. Moreover, the processor 3030, the communicator 3010, and the memory 3020 may be implemented as one chip.

The device 100 may execute a method of generating the virtual arrangement image in which the plurality of objects are arranged according to the above method, and descriptions about overlapping operations are omitted. According to an embodiment of the disclosure, the processor 3030 may control a series of processes through which the device 100 may operate according to the embodiment of the disclosure. For example, the elements of the device 100 may be controlled so as to perform a method of providing a service for generating the virtual arrangement image in which the plurality of objects are arranged according to an embodiment of the disclosure. There may be a plurality of processors 3030, and the processor 3030 may execute a program stored in the memory 3020 to provide a service for generating a virtual arrangement image in which the plurality of objects are rearranged.

The communicator 3010 may transmit/receive a signal to/from the external device (e.g., an external device capturing an image, an external device capable of moving the objects according to the image selected by the user, or the like). The signal sent to/received from the external device may include control information and data. The communicator 3010 may include a radio frequency (RF) transmitter for up-converting and amplifying a frequency of a transmitted signal and an RF receiver for low-noise amplifying a received signal and down-converting a frequency. However, the communicator 3010 above is an example, and the elements of the communicator 3010 are not limited to the RF transmitter and the RF receiver. In addition, the communicator 3010 may receive a signal via a wireless channel and output the signal to the processor 3030, and may transmit the signal output from the processor 3030 via the wireless channel.

According to an embodiment of the disclosure, the memory 3020 may store a program and data required for operations of the device 100. In addition, the memory 3020 may store control information or data included in the signal transmitted/received by the device 100. The memory 3020 may include a storage medium, such as a read-only memory (ROM), a random access memory (RAM), hard disk, a compact disc read only memory (CD-ROM), a digital versatile disc (DVD), or the like, or a combination of the storage media. In addition, there may be a plurality of memories 3020. According to an embodiment of the disclosure, the memory 3020 may store a program for executing an operation of providing a service for generating the virtual arrangement image in which the plurality of objects are rearranged according to the embodiments of the disclosure.

According to an embodiment of the disclosure, the processor 3030 may obtain an image of the plurality of objects, determines at least one of the visual characteristic, the physical characteristic, and the usability characteristic for each of the plurality of objects based on the obtained image, generates data about a result of arranging the plurality of objects based on at least one of the visual characteristic, the physical characteristic, or the usability characteristic, generates the virtual arrangement image in which the plurality of objects are arranged based on the result of arranging the plurality of objects, and displays the virtual arrangement image.

According to an embodiment of the disclosure, the usability characteristic may include at least one of the frequency of use with respect to each of the plurality of objects, information as to whether the object is the target to be arranged, information about the purpose of usage, or information about stability.

According to an embodiment of the disclosure, the processor 3030 may obtain the frequency of use of the first object included in the plurality of objects based on the usability characteristic, and may determine the position of the first object based on the frequency of use.

According to an embodiment of the disclosure, the processor 3030 may determine the position of the first object to be closer to the user preference area than the second object, when the frequency of use of the first object is greater than the frequency of use of the second object.

According to an embodiment of the disclosure, the processor 3030 may determine the user preference area based on the at least one area in which the plurality of objects are arranged and the distance to the device 100.

According to an embodiment of the disclosure, the processor 3030 may determine the frequency of use with respect to each of the plurality of objects based on the amount of position movement of each of the plurality of objects.

According to an embodiment of the disclosure, the processor 3030 may track a change in the position of the first object included in the plurality of objects in one at least one image, and based on the information about the change in the position of the first object, the processor 3030 determines the amount of position movement of the first object and may determine the frequency of use of the first object based on the amount of the position movement.

According to an embodiment of the disclosure, the processor 3030 may determine the similarity between the first object included in the plurality of objects and the other objects based on at least one of the visual characteristic, the physical characteristic, and the usability characteristic, and may determine the position of the first object based on the similarity between the first object and the other objects.

According to an embodiment of the disclosure, the processor 3030 may determine the position of the first object so that the first object is closer to the second object than a third object, when the similarity between the first object and the second object is greater than that between the first object and the third object.

According to an embodiment of the disclosure, the processor 3030 may determine whether the first object is a target to be arranged based on the usability characteristic of the first object included in the plurality of objects, and may determine the position of the first object based on whether the first object is the target to be arranged.

According to an embodiment of the disclosure, when the first object is not a target to be arranged, the processor 3030 may generate a virtual arrangement image in which the first object is distinguished from the other objects that are the target to be arranged.

According to an embodiment of the disclosure, the processor 3030 may generate a UI for selecting at least one virtual arrangement image. Here, the at least one virtual arrangement image may include an image in which the plurality of objects are virtually arranged based on different arrangement algorithms.

According to an embodiment of the disclosure, the processor 3030 may receive an input for selecting one of the at least one virtual arrangement image, and generate a control signal for arranging the plurality of objects according to the selected virtual arrangement image.

According to an embodiment of the disclosure, the processor 3030 identifies each of the plurality of objects based on the obtained image, and may obtain the physical characteristic corresponding to each of the identified objects from the database.

According to an embodiment of the disclosure, the processor 3030 may determine the position of each of the plurality of objects in the virtual space based on the arrangement algorithm.

According to an embodiment of the disclosure, the processor 3030 may assign to a first virtual object the visual characteristic, the physical characteristic, or the usability characteristic corresponding to the first object included in the plurality of objects, and may determine the position of the first virtual object in the virtual space based on the arrangement algorithm.

According to an embodiment of the disclosure, the processor 3030 determines a force applied to the first virtual object in the virtual space, and may determine the position of the first virtual object based on the force applied to the first virtual object.

According to an embodiment of the disclosure, the processor 3030 may determine the attractive force applied between the first virtual object and the second virtual object in the virtual space based on the similarity between the first virtual object and the second virtual object.

The methods according to embodiments described in the claims or the specification of the disclosure may be implemented in hardware, software, or a combination of hardware and software.

As for the software implementation, a computer-readable storage medium storing one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the disclosure.

Such a program (software module, software) may be stored to a random access memory, a non-volatile memory including a flash memory, a ROM, an electrically erasable programmable ROM (EEPROM), a magnetic disc storage device, a CD-ROM, DVDs or other optical storage devices, and a magnetic cassette. Alternatively, the programs may be stored to a memory combining part or all of those recording media. In addition, a plurality of memories may be included.

The programs may be stored in an attachable storage device accessible via a communication network, such as Internet, Intranet, local area network (LAN), wide LAN (WLAN), or storage area network (SAN), or a communication network by combining these networks. Such a storage device may access an apparatus which realizes an embodiment of the disclosure through an external port. In addition, a separate storage device may access the apparatus which realizes an embodiment of the disclosure on the communication network.

In the disclosure, the term "computer program product" or "computer-readable recording medium" is used to generally refer to a medium, such as memory, a hard disc installed in a hard disc drive, or a signal. The "computer program product" or the "computer-readable recording medium" is for providing a software computer system consisting of instructions for obtaining the image of the plurality of objects, determining at least one of the visual characteristic, the physical characteristic, and the usability characteristic of each of the plurality of objects based on the obtained image, generating data about the result of arranging the plurality of objects based on at least one of the virtual arrangement image, the physical characteristic, and the usability characteristic, generating the virtual arrangement image in which the plurality of objects are arranged based on the data about the result of arranging the plurality of objects, and displaying the virtual arrangement image according to the disclosure.

In the embodiments of the disclosure described above, the elements included in the disclosure have been expressed in the singular or plural form according to the suggested embodiments of the disclosure. However, the expression in the singular or plural form is appropriately selected according to the suggested situations for convenience of explanation and is not intended to limit the disclosure to the single or plural elements, and even when a certain element is expressed in the plural form, it may be provided with a single element, and even when a certain element is expressed in the singular form, it may be provided with a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of generating, by a device, a virtual arrangement image in which a plurality of real objects are arranged, the method comprising:
    obtaining an image of the plurality of real objects;
    determining a visual characteristic, a physical characteristic, and a usability characteristic of each of the plurality of real objects, based on the obtained image;
    generating data about a result of arranging a plurality of virtual objects corresponding to the plurality of real objects, based on the visual characteristic, the physical characteristic, and the usability characteristic;
    based on the data about the result of arranging the plurality of virtual objects corresponding to the plurality of real objects, generating a virtual arrangement image in which the plurality of real objects are rearranged; and
    displaying the generated virtual arrangement image,
    wherein the visual characteristic includes at least one of a shape, a texture, or a size of each of the plurality of real objects,
    wherein the physical characteristic includes at least one of a weight, a frictional coefficient, weight distribution, bending capability, or a stretching capability of each of the plurality of real objects, and
    wherein the usability characteristic includes at least one of a frequency of use with respect to each of the plurality of real objects, information as to whether each virtual object corresponding to the plurality of real objects is a target to be arranged, information about a purpose of usage, or information about stability.

2. The method of claim 1, wherein the generating of the data about the result of arranging the plurality of virtual objects corresponding to the plurality of real objects, based on the visual characteristic, the physical characteristic, and the usability characteristic, comprises:
    obtaining a frequency of use of a first real object included in the plurality of real objects, based on the usability characteristic; and
    determining a position of a first virtual object corresponding to the first real object based on the frequency of use.

3. The method of claim 2, wherein the determining of the position of the first virtual object based on the frequency of use comprises:
    when the frequency of use of the first real object is greater than a frequency of use of a second real object, determining the first virtual object is located closer to a user preference area than a second virtual object corresponding to the second real object.

4. The method of claim 1, wherein the determining of the visual characteristic, the physical characteristic, and the usability characteristic of each of the plurality of real objects, based on the obtained image comprises:
    determining the frequency use of with respect to each of the plurality of real objects based on an amount of position movement of each of the plurality of real objects.

5. The method of claim 4, wherein the determining of the frequency of use with respect to each of the plurality of real objects comprises:
    tracking a change in the position of a first real object included in the plurality of real objects from at least one image;
    determining an amount of position movement of the first real object based on information about position change of the first real object; and
    determining the frequency of use of the first real object based on the amount of position movement.

6. The method of claim 1, wherein the generating of the data about the result of arranging the plurality of virtual objects corresponding to the plurality of real objects, based on the visual characteristic, the physical characteristic, and the usability characteristic, comprises:
    determining similarities between a first real object included in the plurality of real objects and other real objects, based on the visual characteristic, the physical characteristic, and the usability characteristic; and
    determining a position of a first virtual object corresponding to the first real object based on the similarities between the first real object and the other real objects.

7. The method of claim 6, wherein the determining of the position of the first virtual object corresponding to the first real object based on the similarities with the other real objects comprises:
    when a similarity between the first real object and a second real object is greater than a similarity between the first real object and a third real object, determining the first virtual object is located closer to a second virtual object corresponding to the second real object than a third virtual object corresponding to the third real object.

8. The method of claim 1, wherein the generating of the data about the result of arranging the plurality of virtual objects corresponding to the plurality of real objects, based on the visual characteristic, the physical characteristic, and the usability characteristic, comprises:
based on the usability characteristic of a first real object included in the plurality of real objects, determining whether a first virtual object corresponding to the first real object is a target to be arranged; and
determining a position of the first virtual object, based on determining that the first virtual object is the target to be arranged.

9. The method of claim 8, wherein the generating of the virtual arrangement image in which the plurality of real objects are rearranged comprises:
generating the virtual arrangement image in which the first virtual object is distinguished from virtual objects that are targets to be arranged, when the first virtual object is not the target to be arranged.

10. The method of claim 1,
wherein the displaying of the virtual arrangement image comprises generating a user interface (UI) for selecting at least one virtual arrangement image, and
wherein the at least one virtual arrangement image includes an image in which the plurality of real objects are virtually arranged based on different arrangement algorithms.

11. The method of claim 1, wherein the determining of the visual characteristic, the physical characteristic, and the usability characteristic of each of the plurality of real objects, based on the obtained image comprises:
identifying each of the plurality of real objects based on the obtained image; and
obtaining, from a database, the physical characteristic corresponding to each of the identified objects.

12. The method of claim 1, further comprising:
determining a position of the plurality of virtual objects respectively corresponding to the plurality of real objects in a virtual space based on an arrangement algorithm.

13. A device for generating a virtual arrangement image in which a plurality of real objects are rearranged, the device comprising:
a memory storing at least one instruction; and
at least one processor configured to execute the at least one instruction to control the device,
wherein the at least one processor is configured to:
obtain an image of the plurality of real objects,
determine a visual characteristic, a physical characteristic, and a usability characteristic of each of the plurality of real objects, based on the obtained image,
generate data about a result of arranging a plurality of virtual objects corresponding to the plurality of real objects, based on the visual characteristic, the physical characteristic, and the usability characteristic,
based on the data about the result of arranging the plurality of virtual objects corresponding to the plurality of real objects, generate the virtual arrangement image in which the plurality of real objects are rearranged, and
display the generated virtual arrangement image,
wherein the visual characteristic includes at least one of a shape, a texture, or a size of each of the plurality of real objects,
wherein the physical characteristic includes at least one of a weight, a frictional coefficient, weight distribution, bending capability, or a stretching capability of each of the plurality of real objects, and
wherein the usability characteristic includes at least one of a frequency of use with respect to each of the plurality of real objects, information as to whether each virtual object corresponding to the plurality of real objects is a target to be arranged, information about a purpose of usage, or information about stability.

14. The device of claim 13, wherein the processor is further configured to:
obtain a frequency of use of a first real object included in the plurality of real objects based on the usability characteristic; and
determine a position of a first virtual object corresponding to the first real object based on the frequency of use.

* * * * *